United States Patent
Chen et al.

(10) Patent No.: US 10,462,647 B2
(45) Date of Patent: Oct. 29, 2019

(54) COMMUNICATION CONTROL METHOD AND APPARATUS, TERMINAL, AND NETWORK PLATFORM

(71) Applicant: Huawei Technologies Co., Ltd., Shenzhen (CN)

(72) Inventors: Xi Chen, Shenzhen (CN); Pengfei Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/752,796

(22) PCT Filed: Aug. 21, 2015

(86) PCT No.: PCT/CN2015/087821
§ 371 (c)(1),
(2) Date: Feb. 14, 2018

(87) PCT Pub. No.: WO2017/031639
PCT Pub. Date: Mar. 2, 2017

(65) Prior Publication Data
US 2018/0242138 A1   Aug. 23, 2018

(51) Int. Cl.
*H04W 8/24* (2009.01)
*H04W 8/18* (2009.01)
(Continued)

(52) U.S. Cl.
CPC .......... *H04W 8/183* (2013.01); *H04W 8/205* (2013.01); *H04W 8/24* (2013.01); *H04W 48/14* (2013.01); *H04W 60/00* (2013.01); *H04W 88/06* (2013.01)

(58) Field of Classification Search
CPC ....... H04W 8/183; H04W 8/205; H04W 8/24; H04W 60/00; H04W 88/06; H04W 48/14
See application file for complete search history.

(56) References Cited

U.S. PATENT DOCUMENTS 8,983,543 B2 * 3/2015 Li ................. H04W 8/183
                                                  455/558
9,351,236 B2 * 5/2016 Fan ............... H04W 48/18
(Continued)

FOREIGN PATENT DOCUMENTS

CN   103250434 A   8/2013
CN   103391535 A   11/2013
(Continued)

OTHER PUBLICATIONS

Foreign Communication From a Counterpart Application, European Application No. 15901910.8, Extended European Search Report dated Jun. 5, 2018, 11 pages.
(Continued)

*Primary Examiner* — Julio R Perez
(74) *Attorney, Agent, or Firm* — Conley Rose, P.C.

(57) ABSTRACT

A communication control method and apparatus, a terminal, and a network platform, where after generating a virtual subscriber identity module (SIM) card application request, the terminal sends the virtual SIM card application request to the network platform, then receives target virtual SIM card data returned by the network platform, and configures a target virtual SIM card in a baseband chip such that a user can conveniently change a SIM card only by downloading virtual SIM card data from the network platform using a network, regardless of a location of the user and time. In addition, according to the method, the user can conveniently select, with reference to displayed information about baseband chips, a baseband chip in which the target virtual SIM card data is configured, and does not need to repeatedly detach and mount a SIM card slot of the terminal for confirmation.

21 Claims, 16 Drawing Sheets

(51) Int. Cl.
*H04W 8/20* (2009.01)
*H04W 88/06* (2009.01)
*H04W 48/14* (2009.01)
*H04W 60/00* (2009.01)

(56) References Cited

U.S. PATENT DOCUMENTS

| | | | |
|---|---|---|---|
| 9,532,219 B2* | 12/2016 | Schell | H04L 63/0823 |
| 9,686,632 B2* | 6/2017 | Lindholm | G06F 21/77 |
| 9,723,481 B2* | 8/2017 | Schell | H04W 8/265 |
| 2010/0311444 A1* | 12/2010 | Shi | H04W 48/18 455/466 |
| 2013/0122864 A1 | 5/2013 | Haggerty et al. | |
| 2013/0157673 A1* | 6/2013 | Brusilovsky | H04W 4/70 455/450 |
| 2014/0038666 A1* | 2/2014 | Chin | H04W 88/06 455/552.1 |
| 2015/0057044 A1 | 2/2015 | Altman | |
| 2015/0099562 A1 | 4/2015 | Xiong et al. | |
| 2016/0044495 A1 | 2/2016 | Schell et al. | |
| 2016/0149605 A1* | 5/2016 | Vecera | H04B 1/3816 455/558 |
| 2017/0195321 A1* | 7/2017 | He | H04W 8/183 |

FOREIGN PATENT DOCUMENTS

| | | |
|---|---|---|
| CN | 104159214 A | 11/2014 |
| CN | 104378754 A | 2/2015 |
| CN | 104509016 A | 4/2015 |
| EP | 2509342 A2 | 10/2012 |
| EP | 2633711 B1 | 3/2018 |
| WO | 2014079223 A1 | 5/2014 |
| WO | 2014169445 A1 | 10/2014 |

OTHER PUBLICATIONS

Machine Translation and Abstract of Chinese Publication No. CN104159214, Nov. 19, 2014, 16 pages.
Machine Translation and Abstract of Chinese Publication No. CN104378754, Feb. 25, 2015, 28 pages.
Machine Translation and Abstract of International Publication No. WO2014079223, May 30, 2014, 15 pages.
Foreign Communication From a Counterpart Application, PCT Application No. PCT/CN2015/087821, English Translation of International Search Report dated May 18, 2016, 3 pages.
Foreign Communication From a Counterpart Application, PCT Application No. PCT/CN2015/087821, English Translation of Written Opinion dated May 18, 2016, 6 pages.
Machine Translation and Abstract of International Publication No. WO2014169445, Oct. 23, 2014, 30 pages.
Foreign Communication From a Counterpart Application, Chinese Application No. 201580081558.X, Chinese Office Action dated Jul. 22, 2019, 13 pages.

* cited by examiner

COMMUNICATION CONTROL METHOD AND APPARATUS, TERMINAL, AND NETWORK PLATFORM

CROSS-REFERENCE TO RELATED APPLICATION

This application is a U.S. National Stage of International Patent Application No. PCT/CN2015/087821 filed on Aug. 21, 2015, which is hereby incorporated by reference in its entirety.

TECHNICAL FIELD

The present disclosure relates to the field of communications technologies, and in particular, to a communication control method and apparatus, a terminal, and a network platform.

BACKGROUND

A subscriber identity module (SIM) card is also referred to as a user identity identification card or a smart card, and only with this card mounted, a terminal such as a mobile terminal or a tablet computer can use a mobile communications data network (the mobile communications data network includes a second generation of wireless mobile telecommunications (2G), third generation of wireless mobile telecommunications (3G), or fourth generation of wireless mobile telecommunications (4G) network. For ease of description, a mobile communications data network is hereinafter referred to as a data network for short, and a network platform that provides a mobile communications data network service is hereinafter referred to as a data network platform). Currently, if a user wants to use a data network service of a mobile operator such as China Mobile, the user needs to apply for a physical SIM card at the operator's counter, and then mounts the physical SIM card on a terminal. An integrated chip on the physical SIM card stores authentication information, such as an identity of a terminal user and an encryption key, and a data network performs a network access authentication operation on the terminal user using the information.

Different terminals and different operators correspond to physical SIM cards of different specifications, and mobile service costs also differ significantly in different regions. A user who uses a roaming scenario much or roams many regions in a single trip needs to subscribe to a national or global data network roaming service in order to use mobile services in different regions. However, roaming costs are quite high. Costs can be reduced using a local data network service in a roaming region, but the user needs to buy a local physical SIM card, mounts the physical SIM card on the terminal, and sets a current SIM card of the terminal as a local SIM card. For a single-card terminal, only one physical SIM card can be mounted. Therefore, an original physical SIM card cannot be used any longer after a physical SIM card in a roaming region is mounted. In view of this, a multi SIM multi standby terminal is created. With multiple baseband chips disposed on such a terminal, multiple physical SIM cards can be mounted. However, when the user needs to frequently change a SIM card due to s service requirement, although multiple physical SIM cards can be mounted on the terminal, a buy and change process of the physical SIM cards is quite tedious. In addition, the user needs to select one from the multiple physical SIM cards to reserve and select one from the multiple physical SIM cards to change, and to determine which physical SIM card slot a physical SIM card is to be mounted in, the user needs to repeatedly detach physical SIM card slots for confirmation. This process is quite inconvenient.

SUMMARY

Embodiments of the present disclosure provide a communication control method and apparatus, a terminal, and a network platform in order to resolve a problem of inconvenience in changing a SIM card.

To resolve the foregoing technical problem, the embodiments of the present disclosure disclose the following technical solutions.

A first aspect provides a communication control method, applied to a terminal, where the method includes generating a virtual SIM card application request, where the virtual SIM card application request carries a card selection parameter, sending the virtual SIM card application request to a network platform, receiving target virtual SIM card data returned by the network platform, where the target virtual SIM card data corresponds to the card selection parameter, and at least includes a target virtual SIM card identifier and target virtual SIM card authentication information, determining a preset receptor baseband chip, and configuring the target virtual SIM card data in the preset receptor baseband chip of the terminal.

With reference to the first aspect, in a first possible implementation manner of the first aspect, the card selection parameter includes at least one of a current geographic location of the terminal, a device type of the terminal, a data network service price, or a data network service time limit.

With reference to the first aspect, in a second possible implementation manner of the first aspect, determining a preset receptor baseband chip includes displaying information about at least one baseband chip on the terminal, receiving a preset receptor baseband chip selection operation that is input by a user on the terminal, obtaining an identifier of a selected baseband chip according to the preset receptor baseband chip selection operation, and determining the baseband chip corresponding to the identifier as the preset receptor baseband chip.

With reference to the first aspect, in a third possible implementation manner of the first aspect, before configuring the target virtual SIM card data in the preset receptor baseband chip of the terminal, the method further includes disabling the mobile data channel if a mobile data channel of a physical SIM card is in an enabled state, where the physical SIM card is connected to the preset receptor baseband chip.

With reference to the first aspect, in a fourth possible implementation manner of the first aspect, after configuring the target virtual SIM card data in the preset receptor baseband chip of the terminal, the method further includes displaying a virtual SIM card icon on a terminal screen.

With reference to any one of the first aspect, or the first to the fourth possible implementation manners of the first aspect, in a fifth possible implementation manner of the first aspect, the method further includes receiving a virtual SIM card cancellation operation that is input by the user on the terminal, generating a virtual SIM card cancellation notification according to the virtual SIM card cancellation operation, sending the virtual SIM card cancellation notification to the network platform, where the virtual SIM card cancellation notification carries a target virtual SIM card identifier, the target virtual SIM card identifier is used to make the network platform reset invalid target virtual SIM card data in the network platform to valid, and the target virtual SIM card data corresponds to the target virtual SIM card identifier, and deleting the target virtual SIM card data in the preset receptor baseband chip according to the virtual SIM card cancellation operation.

With reference to the fifth possible implementation manner of the first aspect, in a sixth possible implementation manner of the first aspect, after receiving a virtual SIM card cancellation operation that is input by the user on the terminal, the method further includes hiding or removing the virtual SIM card icon on the terminal screen.

A second aspect provides a virtual SIM card cancellation method, applied to a terminal for which a virtual SIM card is already configured, where the method includes receiving a virtual SIM card cancellation operation that is input by a user on the terminal, generating a virtual SIM card cancellation notification according to the virtual SIM card cancellation operation, sending the virtual SIM card cancellation notification to a network platform, where the virtual SIM card cancellation notification carries a target virtual SIM card identifier, the target virtual SIM card identifier is used to make the network platform reset invalid target virtual SIM card data in the network platform to valid, and the target virtual SIM card data corresponds to the target virtual SIM card identifier, and deleting the target virtual SIM card data in a preset receptor baseband chip according to the virtual SIM card cancellation operation.

With reference to the second aspect, in a first possible implementation manner of the second aspect, the virtual SIM card cancellation notification further carries a virtual SIM card cancellation parameter such that the network platform deletes the invalid target virtual SIM card data in the network platform according to the virtual SIM card cancellation parameter.

With reference to the second aspect, or the first possible implementation manner of the second aspect, in a second possible implementation manner of the second aspect, the method further includes receiving a virtual SIM card cancellation receipt sent by a server, where the virtual SIM card cancellation receipt includes virtual SIM card service settlement information, and displaying the virtual SIM card cancellation receipt.

A third aspect provides a communication control method, applied to a network platform, where the method includes receiving a virtual SIM card application request sent by a terminal, where the virtual SIM card application request carries a card selection parameter, searching for target virtual SIM card data corresponding to the card selection parameter, where the target virtual SIM card data at least includes a target virtual SIM card identifier and target virtual SIM card authentication information, sending the target virtual SIM card data to the terminal, and performing invalidation processing on the target virtual SIM card data that is in the network platform and corresponds to the card selection parameter.

With reference to the third aspect, in a first possible implementation manner of the third aspect, the method further includes receiving a virtual SIM card cancellation notification sent by the terminal, where the virtual SIM card cancellation notification carries a target virtual SIM card identifier, and re-validating, according to the virtual SIM card cancellation notification, target virtual SIM card data that is in the network platform and corresponds to the target virtual SIM card identifier.

With reference to the third aspect, or the first possible implementation manner of the third aspect, in a second possible implementation manner of the third aspect, performing invalidation processing on the target virtual SIM card data that is in the network platform and corresponds to the card selection parameter includes setting the target virtual SIM card data to "reading forbidden," or marking the target virtual SIM card data as "used."

With reference to the second possible implementation manner of the third aspect, in a third possible implementation manner of the third aspect, re-validating target virtual SIM card data that is in the network platform and corresponds to the target virtual SIM card identifier includes resetting the "reading forbidden" target virtual SIM card data to "reading allowed," or marking, as "unused," the target virtual SIM card data marked as "used."

A fourth aspect provides a communications apparatus, applied to a terminal, where the apparatus includes an application request generation unit configured to generate a virtual SIM card application request, where the virtual SIM card application request carries a card selection parameter, a request sending unit configured to send the virtual SIM card application request to a network platform, a virtual SIM card receiving unit configured to receive target virtual SIM card data returned by the network platform, where the target virtual SIM card data corresponds to the card selection parameter, and at least includes a target virtual SIM card identifier and target virtual SIM card authentication information, a preset receptor baseband chip determining unit configured to determine a preset receptor baseband chip, and a configuration unit configured to configure the target virtual SIM card data in the preset receptor baseband chip of the terminal.

With reference to the fourth aspect, in a first possible implementation manner of the fourth aspect, the card selection parameter includes at least one of a current geographic location of the terminal, a device type of the terminal, a data network service price, or a data network service time limit.

With reference to the fourth aspect, in a second possible implementation manner of the fourth aspect, the preset receptor baseband chip determining unit includes a baseband chip information display module configured to display information about each baseband chip on the terminal, a baseband chip selection module configured to receive a preset receptor baseband chip selection operation that is input by a user on the terminal before the target virtual SIM card data is configured in the preset receptor baseband chip of the terminal, a preset receptor baseband chip identifier obtaining module configured to obtain an identifier of a selected baseband chip according to the preset receptor baseband chip selection operation, and a receptor baseband chip presetting module configured to determine the baseband chip corresponding to the identifier as the preset receptor baseband chip.

With reference to the fourth aspect, in a third possible implementation manner of the fourth aspect, the apparatus further includes a channel disabling unit configured to disable the mobile data channel if a mobile data channel of a physical SIM card is in an enabled state, where the physical SIM card is connected to the preset receptor baseband chip.

With reference to the fourth aspect, in a fourth possible implementation manner of the fourth aspect, the apparatus further includes a virtual SIM card icon display unit configured to display a virtual SIM card icon on a terminal screen after the target virtual SIM card data is configured in the preset receptor baseband chip of the terminal.

With reference to any one of the fourth aspect, or the first to the fourth possible implementation manners of the fourth aspect, in a fifth possible implementation manner of the fourth aspect, the apparatus further includes a cancellation operation receiving unit configured to receive a virtual SIM card cancellation operation that is input by the user on the terminal, a cancellation notification generation unit configured to generate a virtual SIM card cancellation notification according to the virtual SIM card cancellation operation, a cancellation notification sending unit configured to send the virtual SIM card cancellation notification to the network platform, where the virtual SIM card cancellation notification carries a target virtual SIM card identifier such that the network platform resets invalid target virtual SIM card data in the network platform to valid, and the target virtual SIM card data corresponds to the target virtual SIM card identifier, and a virtual SIM card cancellation unit configured to delete the target virtual SIM card data in the preset receptor baseband chip according to the virtual SIM card cancellation operation.

With reference to the fifth possible implementation manner of the fourth aspect, in a sixth possible implementation manner of the fourth aspect, the apparatus further includes a virtual SIM card icon removal unit configured to hide or remove the virtual SIM card icon on the terminal screen after the virtual SIM card cancellation operation that is input by the user on the terminal is received.

A fifth aspect provides a virtual SIM card cancellation apparatus, applied to a terminal for which a virtual SIM card is already configured, where the apparatus includes a cancellation operation receiving unit configured to receive a virtual SIM card cancellation operation that is input by a user on the terminal, a cancellation notification sending unit configured to send a virtual SIM card cancellation notification to a network platform, where the virtual SIM card cancellation notification carries a target virtual SIM card identifier, the target virtual SIM card identifier is used to make the network platform reset invalid target virtual SIM card data in the network platform to valid, and the target virtual SIM card data corresponds to the target virtual SIM card identifier, and a virtual SIM card cancellation unit configured to delete the target virtual SIM card data in the preset receptor baseband chip according to the virtual SIM card cancellation operation.

With reference to the fifth aspect, in a first possible implementation manner of the fifth aspect, the virtual SIM card cancellation notification further carries a virtual SIM card cancellation parameter such that the network platform deletes the invalid target virtual SIM card data in the network platform according to the virtual SIM card cancellation parameter.

With reference to the fifth aspect, or the first possible implementation manner of the fifth aspect, in a second possible implementation manner of the fifth aspect, the apparatus further includes a cancellation receipt receiving unit configured to receive a virtual SIM card cancellation receipt sent by a server, where the virtual SIM card cancellation receipt includes virtual SIM card service settlement information, and a cancellation receipt display unit configured to display the virtual SIM card cancellation receipt.

A sixth aspect provides a communication control apparatus, applied to a network platform, where the apparatus includes an application request receiving unit configured to receive a virtual SIM card application request sent by a terminal, where the virtual SIM card application request carries a card selection parameter, a target virtual SIM card data searching unit configured to search for target virtual SIM card data corresponding to the card selection parameter, where the target virtual SIM card data at least includes a target virtual SIM card identifier and target virtual SIM card authentication information, a target virtual SIM card data sending unit configured to send the target virtual SIM card data to the terminal, and an invalidation processing unit configured to perform invalidation processing on the target virtual SIM card data that is in the network platform and corresponds to the card selection parameter.

With reference to the sixth aspect, in a first possible implementation manner of the sixth aspect, the apparatus further includes a cancellation notification receiving unit configured to receive a virtual SIM card cancellation notification sent by the terminal, where the virtual SIM card cancellation notification carries a target virtual SIM card identifier, and a virtual SIM card data recycling unit configured to re-validate, according to the virtual SIM card cancellation notification, target virtual SIM card data that is in the network platform and corresponds to the target virtual SIM card identifier.

With reference to the sixth aspect, or the first possible implementation manner of the sixth aspect, in a second possible implementation manner of the sixth aspect, the invalidation processing unit is further configured to set the target virtual SIM card data to "reading forbidden," or mark the target virtual SIM card data as "used."

With reference to the second possible implementation manner of the sixth aspect, in a third possible implementation manner of the sixth aspect, the virtual SIM card data recycling unit is further configured to reset the "reading forbidden" target virtual SIM card data to "reading allowed," or mark, as "unused," the target virtual SIM card data marked as "used."

A seventh aspect provides a terminal, including a memory, a processor, a baseband chip, a terminal transmitter, and a terminal receiver, where the processor is configured to generate a virtual SIM card application request by invoking a program or an instruction stored in the memory, where the virtual SIM card application request carries a card selection parameter, the terminal transmitter is configured to send the virtual SIM card application request to a network platform, the terminal receiver is configured to receive target virtual SIM card data returned by the network platform, where the target virtual SIM card data corresponds to the card selection parameter, and at least includes a target virtual SIM card identifier and target virtual SIM card authentication information, and the processor is further configured to determine a preset receptor baseband chip, and configure the target virtual SIM card data in the preset receptor baseband chip of the terminal.

With reference to the seventh aspect, in a first possible implementation manner of the seventh aspect, the card selection parameter includes at least one of a current geographic location of the terminal, a device type of the terminal, a data network service price, or a data network service time limit.

With reference to the seventh aspect, in a second possible implementation manner of the seventh aspect, the terminal further includes a screen, where when determining the preset receptor baseband chip, the processor is further configured to display information about each baseband chip on the terminal on the screen. The screen is configured to obtain a preset receptor baseband chip selection operation of a user, and when determining the preset receptor baseband chip, the processor is further configured to obtain an identifier of a selected baseband chip according to information about the preset receptor baseband chip selection operation, and determine the baseband chip corresponding to the identifier as the preset receptor baseband chip.

With reference to the seventh aspect, in a third possible implementation manner of the seventh aspect, before configuring the target virtual SIM card data in the preset receptor baseband chip of the terminal, the processor is further configured to disable the mobile data channel if a mobile data channel of a physical SIM card is in an enabled state, where the physical SIM card is connected to the preset receptor baseband chip.

With reference to the seventh aspect, in a fourth possible implementation manner of the seventh aspect, the terminal further includes a screen, where after configuring the target virtual SIM card data in the preset receptor baseband chip of the terminal, the processor is further configured to display a virtual SIM card icon on the screen.

With reference to any one of the seventh aspect, or the first to the fourth possible implementation manners of the seventh aspect, in a fifth possible implementation manner of the seventh aspect, the screen is further configured to receive a virtual SIM card cancellation operation that is input by the user. The processor is further configured to generate a virtual SIM card cancellation notification according to information about the virtual SIM card cancellation operation. The terminal transmitter is further configured to send the virtual SIM card cancellation notification to the network platform, where the virtual SIM card cancellation notification carries a target virtual SIM card identifier such that the network platform resets invalid target virtual SIM card data in the network platform to valid, and the target virtual SIM card data corresponds to the target virtual SIM card identifier, and the processor is further configured to delete the target virtual SIM card data in the preset receptor baseband chip according to the virtual SIM card cancellation operation.

With reference to the fifth possible implementation manner of the seventh aspect, in a sixth possible implementation manner of the seventh aspect, after the screen receives the virtual SIM card cancellation operation that is input by the user on the terminal, the processor is further configured to hide or remove the virtual SIM card icon on the screen.

An eighth aspect provides a network platform, including a database, a processor, a platform receiver, and a platform transmitter, where the database is configured to store virtual SIM card data, the platform receiver is configured to receive a virtual SIM card application request sent by a terminal, where the virtual SIM card application request carries a card selection parameter, the processor is configured to search for target virtual SIM card data corresponding to the card selection parameter, where the target virtual SIM card data at least includes a target virtual SIM card identifier and target virtual SIM card authentication information, the platform transmitter is configured to send the target virtual SIM card data to the terminal, and the processor is further configured to perform invalidation processing on the target virtual SIM card data that is in the network platform and that corresponds to the card selection parameter.

With reference to the eighth aspect, in a first possible implementation manner of the eighth aspect, the platform receiver is further configured to receive a virtual SIM card cancellation notification sent by the terminal, where the virtual SIM card cancellation notification carries a target virtual SIM card identifier, and the processor is further configured to re-validate, according to the virtual SIM card cancellation notification, target virtual SIM card data that is in the network platform and that corresponds to the target virtual SIM card identifier.

With reference to the eighth aspect, in a second possible implementation manner of the eighth aspect, when performing invalidation processing on the target virtual SIM card data that is in the network platform and corresponds to the card selection parameter, the processor is further configured to set the target virtual SIM card data to "reading forbidden," or mark the target virtual SIM card data as "used."

With reference to the second possible implementation manner of the eighth aspect, in a third possible implementation manner of the eighth aspect, when re-validating the target virtual SIM card data that is in the network platform and corresponds to the target virtual SIM card identifier, the processor is further configured to reset the "reading forbidden" target virtual SIM card data to "reading allowed," or mark, as "unused," the target virtual SIM card data marked as "used."

It may be learned from the foregoing technical solutions that, according to the communication control method and apparatus, the terminal, and the network platform that are provided in the embodiments of the present disclosure, after generating a virtual SIM card application request, the terminal sends the virtual SIM card application request to the network platform, then receives target virtual SIM card data returned by the network platform to complete online application for a virtual SIM card, and configures a target virtual SIM card in a baseband chip. This is equivalent to replacing a physical SIM card with a virtual SIM card. In this way, a user can conveniently change a SIM card only by downloading virtual SIM card data from the network platform using a network, regardless of a location of the user (for example, the location of the user is far away from an operator) and time (for example, the operator is not in business hours). In addition, according to the method provided in the embodiments, the user can designate a preset receptor baseband chip with reference to displayed information about baseband chips, that is, conveniently select a baseband chip in which the target virtual SIM card data is configured, and does not need to repeatedly detach and mount a SIM card slot of the terminal for confirmation.

BRIEF DESCRIPTION OF DRAWINGS

Specification accompanying drawings constituting a part of this application are used to provide further understanding of the present disclosure, and schematic embodiments of the present disclosure and descriptions thereof are used to explain the present disclosure, but do not constitute an improper limitation to the present disclosure.

Figure 1:
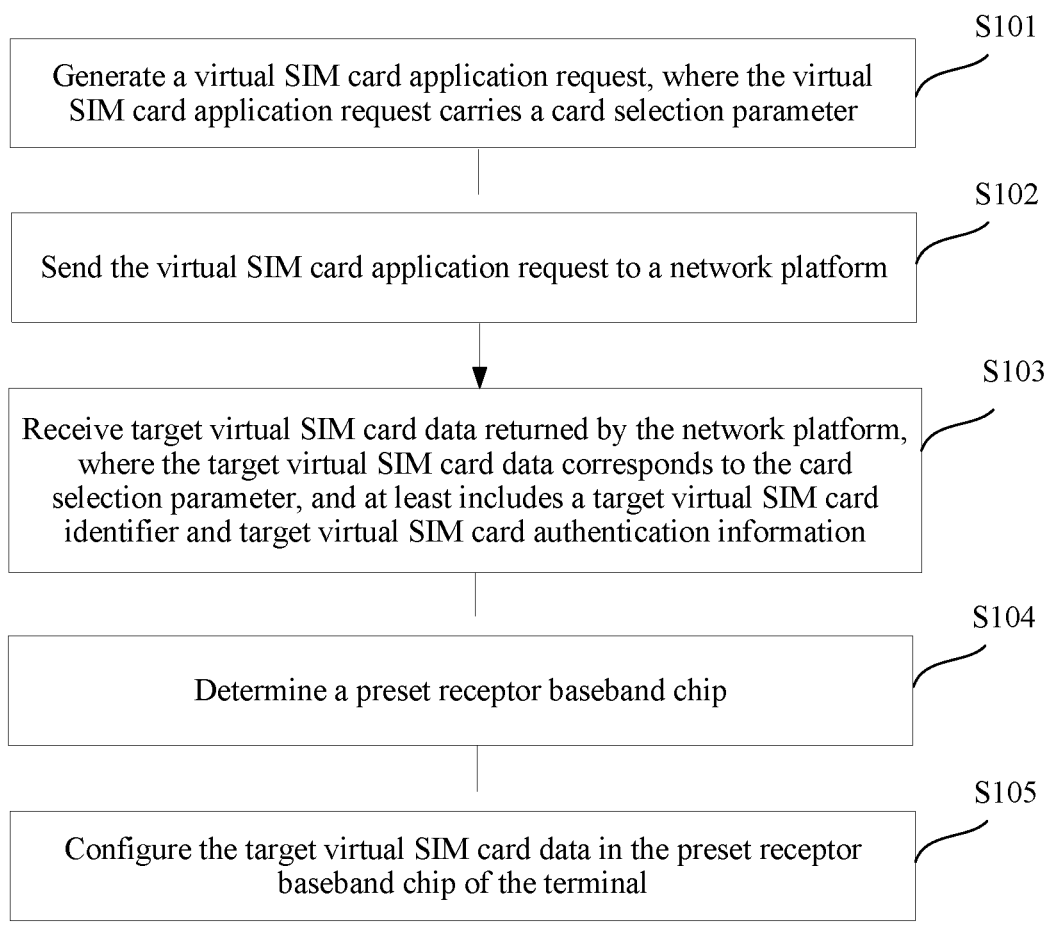
FIG. 1 is a schematic flowchart of a communication control method applied to a terminal according to an embodiment of the present disclosure.

To describe the technical solutions in the embodiments of the present disclosure more clearly, the following briefly describes the accompanying drawings required for describing the embodiments. A person of ordinary skill in the art may still derive other drawings from these accompanying drawings without creative efforts.

DESCRIPTION OF EMBODIMENTS

For ease of understanding of technical solutions of the present disclosure, content related to SIM card authentication is first described.

SIM card authentication information mainly includes a key identity (Ki), an international mobile subscriber Identity (IMSI), an operator variant algorithm configuration field (OP), and a related encryption algorithm and a related IMSI authentication algorithm. A Ki is a key for encrypted data transmission between a SIM card and an operator. An IMSI is used to identify a mobile subscriber, and consists of a country code to which the mobile subscriber belongs, a network code to identify a data network to which the mobile subscriber belongs, and a mobile subscriber identification number. Both a Ki and an IMSI are used during authentication in a data network, and a random variable is generated after a series of system security authentication algorithms. After an encryption operation, the random variable is compared with memory data of a terminal. If a comparison result is correct, authentication succeeds, and an identity of the terminal is confirmed. The terminal can access the data network after the authentication succeeds. An OP is an input parameter for an authentication calculation, and all users of an operator may use a same OP to distinguish from users of another operator.

After a user mounts a bought SIM card on a terminal and powers on the terminal, a baseband chip reads SIM card data using a mobile data channel of the SIM card, and configures the SIM card data in the baseband chip. The SIM card data includes data network authentication information, SIM card status information, and the like. The terminal sends the data network authentication information to a data network platform, and the data network platform completes authentication. The terminal that is authenticated accesses the data network and uses the data network to implement functions such as call, short message service (SMS) message receiving and sending, and Internet surfing.

Moreover, the data network platform includes a database responsible for terminal user management. The database stores and records subscription data of a user in an area controlled by the database, and dynamically updates location information of the user in order to provide network routing of a called party in a call service. The data network platform further includes an authentication center (AC) that is used to complete authentication on the terminal, store an authentication parameter of the terminal, and generate and transmit a corresponding authentication parameter according to a mobile switching center (MSC) /visitor location register (VLR) request.

To achieve objectives of the present disclosure, the present disclosure provides a communication control method and apparatus, a terminal, and a network platform. According to the method, a network platform stores virtual SIM card data, and the virtual SIM card data includes authentication information for a terminal of a user to access a data network. When the user needs to change a SIM card, the user does not need to buy a SIM card from an operator and mount the SIM card on the terminal, but only needs to send a card selection parameter to the network platform and apply to the network platform for the virtual SIM card data. The network platform obtains, according to the card selection parameter, target virtual SIM card data that meets a requirement, and returns the target virtual SIM card data to the terminal. After selecting a preset receptor baseband chip, that is, after selecting a baseband chip in which the target virtual SIM card data is configured, the terminal receives the target virtual SIM card data, and then configures the target virtual SIM card data in the baseband chip. A physical SIM card is replaced with a virtual SIM card such that changing a SIM card on the terminal is implemented.

The main idea of the present disclosure is described above. To help a person skilled in the art to better understand the solutions of the present disclosure, the following clearly and completely describes the technical solutions in the embodiments of the present disclosure with reference to the accompanying drawings in the embodiments of the present disclosure. The described embodiments are merely some rather than all of the embodiments of the present disclosure. All other embodiments obtained by a person of ordinary skill in the art based on the embodiments of the present disclosure without creative efforts shall fall within the protection scope of the present disclosure.

Referring to FIG. 1, FIG. 1 is a schematic flowchart of a communication control method according to an embodiment of the present disclosure. The method is applied to a terminal, and may be further applied to a processor of the terminal. As shown in FIG. 1, the method may include the following steps.

Step S101: Generate a virtual SIM card application request, where the virtual SIM card application request carries a card selection parameter.

Step S102: Send the virtual SIM card application request to a network platform.

In an implementation manner, the terminal generates the virtual SIM card application request according to a trigger condition. The trigger condition includes but is not limited to the following, where a data network service region to which the terminal belongs changes, or no physical SIM card is detected on the terminal.

After a terminal on which a SIM card is mounted is authenticated, a data network platform stores information about the terminal, and dynamically updates a location of the terminal. If the data network platform is used as the network platform in the present disclosure, when the data network service region to which the terminal belongs changes (that is, roaming) due to a geographic location change, the data network platform may send a roaming notification to the terminal after detecting that the data network service region to which the terminal belongs changes. The terminal generates the virtual SIM card application request after receiving the roaming notification. It should be noted that, if the SIM card is never mounted on the terminal, the data network platform has no information about the terminal, or if the SIM card mounted on the terminal is detached, the data network platform does not update the location of the terminal. Therefore, a manner in which that the data network platform sends the roaming notification to the terminal is used as the trigger condition is applicable to a case in which the SIM card is mounted on the terminal, and the SIM card of the terminal is authenticated.

In another implementation manner in which that the data network service region to which the terminal belongs changes is used as the trigger condition, the terminal is pre-registered at the network platform, and the network platform dynamically updates positioning information of the terminal. The positioning information of the terminal is obtained by the terminal using a positioning module (for example, a global positioning system (GPS) module) of the terminal, and is sent to the network platform. The network platform compares the received positioning information of the terminal with a prestored data network service region. After the data network service region to which the terminal belongs changes, a data network sends a roaming notification to the terminal. The terminal generates the virtual SIM card application request after receiving the roaming notification. In this implementation manner, the network platform may be the data network platform, or may be independent of the data network platform.

The virtual SIM card application request may also be generated by the terminal after the terminal detects that a data network service region to which a geographic location of the terminal belongs changes. A correspondence between a geographic location and a data network service region is prestored on the terminal. The terminal obtains the geographic location of the terminal in real time using the positioning module, and obtains, according to the correspondence between a geographic location and a data network service region, the data network service region to which the terminal belongs. When the data network service region to which the terminal belongs changes, the terminal generates the virtual SIM card application request. The data network service region is generally divided according to a city, and therefore the terminal may generate the virtual SIM card application request when detecting that a city to which the geographic location of the terminal belongs changes.

It should be noted that the network platform is pre-designated, and is set as a network platform in which the terminal performs a related service such as virtual SIM card application by default. The network platform may be the data network platform such as a China Mobile data network platform or a China Unicom data network platform, or may not be limited to an operator's data network platform that provides a virtual SIM card service (i.e., a universal data network platform). Alternatively, the network platform may be another network platform independent of the data network platform. A communication link between the network platform and the terminal includes but is not limited to an available data channel such as a mobile data link (2G/3G/4G), a WI-FI link, or a BLUETOOTH link that is of a physical SIM card mounted on the terminal and that already takes effect.

After being powered on, the terminal detects whether a physical SIM card is mounted. That the terminal detects no physical SIM card is used as the trigger condition, that is, if the physical SIM card is not mounted on the terminal, the terminal generates the virtual SIM card application request. In this case, a data channel such as a WI-FI link or a BLUETOOTH link is used as the communication link between the network platform and the terminal.

Generating the virtual SIM card application request by the terminal according to the trigger condition may be automatically performed. Alternatively, after the trigger condition is generated, the terminal may generate and display a user operation prompt message, and provide an operation user interface (UI) for the user to determine whether to apply for a virtual SIM card. After receiving an operation of the user to determine to apply for the virtual SIM card, the terminal generates the virtual SIM card application request.

The virtual SIM card application request is generated according to a packet specification and requirement specified in a communications protocol between the terminal and the network platform. The card selection parameter is used as a parameter of the virtual SIM card application request. For example, a request interface name of a packet of the virtual SIM card application request is requestVSIM (which means requesting a virtual SIM card), and a parameter name of the card selection parameter is loc, and a parameter value of loc is "Hong Kong, China." The card selection parameter includes but is not limited to any one of or a combination of any two or more of a current geographic location of the terminal, a device type of the terminal, a data network service price, or a data network service time limit. The parameter value "Hong Kong, China" of loc in the foregoing example is the current geographic location of the terminal.

Service tariffs and service items of a data network are different in different service regions. Therefore, a physical SIM card is generally classified, for example, as a Beijing Mobile SIM card or a Tianjin Mobile SIM card according to a data network service region. After the terminal is authenticated and accesses a network, the data network determines, according to a data network service region to which a SIM card belongs and the current geographic location of the terminal, whether to provide a local service or a trans-regional service for the terminal. When a terminal on which a SIM card that belongs to a data network service region is mounted roams to another data network service region, service tariffs and service items of the data network change, and costs are increased. This is why a user replaces a SIM card on a terminal with a local SIM card after leaving a region for another region. If the card selection parameter includes the current geographic location of the terminal, the data network platform may return local virtual SIM card data to the terminal as the target virtual SIM card data according to the current geographic location of the terminal such that the user can use a local data network service. The terminal can directly read the GPS module or a built-in positioning module of the terminal to obtain the current geographic location of the terminal. If the data network platform is used as the network platform in the present disclosure, because the data network platform may dynamically update the location of the terminal, the card selection parameter may not include the current geographic location of the terminal. The data network platform returns the local virtual SIM card data to the terminal according to an updated current geographic location of the terminal. In this case, the card selection parameter may be null.

Because the virtual SIM card data for which the user applies is not necessarily limited to local virtual SIM card data, the current geographic location of the terminal may be replaced with the data network service region in the card selection parameter. The data network service region is input by the user using a terminal UI. After receiving the virtual SIM card application request, the data network platform obtains, according to the data network service region in the card selection parameter, virtual SIM card data corresponding to the data network service region, and returns the virtual SIM card data to the terminal as the target virtual SIM card data.

To improve data network service fineness, in addition to the current geographic location of the terminal or the data network service region, the card selection parameter may be any one of or a combination of any two or more of a current geographic location, a device type of the terminal, a data network service price, or a data network service time limit, or the card selection parameter is any one of or a combination of any two or more of a service region, a device type of the terminal, a data network service price, or a data network service time limit. For terminals of different device types, such as an IPHONE and an ANDROID mobile phone, corresponding physical SIM card data is different, and corresponding virtual SIM card data is also different. Therefore, the device type of the terminal may be included in the card selection parameter such that the network platform returns virtual SIM card data that matches the device type of the terminal to the terminal according to the device type. If the virtual SIM card data in the network platform is universal, that is, applicable to a terminal of any device type, the device type of the terminal does not need to be added to the card selection parameter. In addition, a mobile operator generally provides data network services of different prices and time limits for a user to select, for example, a 50-yuan call and data monthly service. Therefore, the data network service price and service time limit may be added to the card selection parameter. The user may select services of different prices and time limits according to a need, and the network platform may return virtual SIM card data that meets a requirement to the terminal according to the different data network service prices and time limits. For the current geographic location of the terminal (or the service region of the terminal), the device type of the terminal, the data network service price, and the data network service, one of them may be selected as the card selection parameter, or a combination of two of them may be used as the card selection parameter, a combination of three of them may be used as the card selection parameter, or all of them may be used as the card selection parameter. Which item is used as the card selection parameter may be determined according to specific virtual SIM card data that can be provided by the network platform. If the network platform can provide virtual SIM card data that meets multiple card selection parameter requirements, more corresponding card selection parameters may be provided for the user to select. For example, if the network platform provides only virtual SIM card data that is of a uniform data network service price and time limit and that is applicable to various device types, the card selection parameter may include only the current geographic location of the terminal. When there are multiple card selection parameters, data network service fineness may be improved, and different requirements of the user may be met. The card selection parameter is not limited to the foregoing several items. If there are multiple network platforms that can provide virtual SIM card services, the card selection parameter may further include a network platform type, for example a China Mobile virtual SIM card network platform and a China Unicom virtual SIM card network platform. If there is only one network platform that can provide a virtual SIM card service, or virtual SIM card service cooperation is performed only with one network platform, the terminal applies to the network platform for the virtual SIM card by default, and the user does not need to select the network platform.

In another implementation manner, the terminal receives a virtual SIM card application operation that is input by the user on the terminal, and generates the virtual SIM card application request according to the virtual SIM card application operation. The virtual SIM card application request carries the card selection parameter. The terminal provides a UI such that the user can perform a related operation such as virtual SIM card application, and the user inputs the card selection parameter. For example, the UI provides a virtual SIM card application button and a card selection parameter input box, and the user enables a virtual SIM card application function by tapping or sliding the virtual SIM card application button in the UI, then inputs the card selection parameter or selects a card selection parameter option in the input box, and performs an application determining operation in order to complete virtual SIM card application. Alternatively, the UI provides a virtual SIM card application enabling button and a card selection parameter classification application button, and after enabling a virtual SIM card application function by tapping the virtual SIM card application enabling button, the user taps an application button "classified according to the card selection parameter" for application, and does not need to additionally input the card selection parameter. The terminal receives, using the UI, the virtual SIM card application operation that is input by the user, and information about the virtual SIM card application operation includes a card selection parameter of a virtual SIM card. The terminal receives the card selection parameter at the same time when receiving the virtual SIM card application operation, or reads the card selection parameter from the information about the application operation after receiving the virtual SIM card application operation, and then the terminal generates the virtual SIM card application request, and adds the card selection parameter to the virtual SIM card application request.

After generating the virtual SIM card application request, the terminal sends the virtual SIM card application request to the network platform. A communication link between the network platform and the terminal includes but is not limited to an available data channel such as a mobile data link (2G/3G/4G), a WI-FI link, or a BLUETOOTH link that is of a physical SIM card mounted on the terminal and that already takes effect. If the physical SIM card is not mounted on the terminal, or a mobile data link does not take effect, the data channel such as the WI-FI link or the BLUETOOTH link is used.

Step S103: Receive target virtual SIM card data returned by the network platform, where the target virtual SIM card data corresponds to the card selection parameter, and at least includes a target virtual SIM card identifier and target virtual SIM card authentication information.

After receiving the virtual SIM card application request sent by the terminal, the network platform searches, according to the card selection parameter in the virtual SIM card application request, the virtual SIM card data stored in the network platform for the target virtual SIM card data corresponding to the card selection parameter, and returns the found target virtual SIM card data to the terminal. If the network platform does not find the target virtual SIM card data corresponding to the card selection parameter, the network platform may return an error notification to the terminal to notify the user of a virtual SIM card application failure and an application failure reason.

The target virtual SIM card data at least includes the target virtual SIM card identifier and the target virtual SIM card authentication information. The target virtual SIM card identifier is used to distinguish the target virtual SIM card data from other virtual SIM card data such that the network platform and the terminal identify the target virtual SIM card data. The target virtual SIM card authentication information is used to make the terminal authenticated by the data network platform to access a data network. It should be noted that the terminal sends the authentication information to the data network platform for authentication. If the data network platform is not used as the network platform in the present disclosure, the terminal does not need to send the authentication information to the network platform in the present disclosure.

In terms of a physical SIM card, SIM card data stored in the physical SIM card generally includes original product data stored by a SIM card manufacturer, authentication information, data stored by a user such as an SMS message, a call record, and a telephone number, temporarily stored data related to a data network, for example, network connection data automatically stored and updated in the user's card use process, and a related service code such as a personal identification number (PIN) code. A core of the physical SIM card data is the authentication information, and other data is product description data and extended data. That is, a basic function (such as, network access) of a SIM card can be implemented provided that there is the authentication information, and a function of other data is to extend functions. Therefore, the virtual SIM card data having the authentication information enables basic functions of a physical SIM card to be completed after the virtual SIM card data is configured in a baseband chip. The virtual SIM card data may further include other data to extend functions of the virtual SIM card. For example, configuration data compatible with different device types is added such that the virtual SIM card data can be configured in terminals of different device types and becomes universal.

Step S104: Determine a preset receptor baseband chip.

For a terminal in which multiple baseband chips are disposed, such as a dual SIM dual standby mobile phone, a baseband chip in which the target virtual SIM card data is configured needs to be determined, and a baseband chip in which the target virtual SIM card data is configured is the preset receptor baseband chip. If the user does not have a specific requirement for baseband chip selection, but only requires new SIM card data to replace existing SIM card data, the user may randomly select a baseband chip on the terminal as the preset receptor baseband chip.

In another case, if the user has a specific requirement for baseband chip selection, for example, SIM card data in a baseband chip needs to be reserved, and SIM card data in a baseband chip needs to be replaced, the user has a purpose on baseband chip selection. In this case, step S104 may include the following steps.

(a1) Displaying information about at least one baseband chip on the terminal;

(a2) Receiving a preset receptor baseband chip selection operation that is input by a user on the terminal;

(a3) Obtaining an identifier of a selected baseband chip according to the preset receptor baseband chip selection operation; and (a4) Determining the baseband chip corresponding to the identifier as the preset receptor baseband chip.

The terminal reads the information about the at least one baseband chip, and then displays the information on a terminal screen such that the user selects one baseband chip as the preset receptor baseband chip. The terminal may read and display information about all baseband chips, or read, according to previous settings, and display information about selectable baseband chips.

The information may include an idle state or an occupied state of each baseband chip and information about SIM card data configured in the baseband chip, for example, a data network service provider and a telephone number that correspond to the SIM card data. If the baseband chip is not effectively connected to the physical SIM card, the baseband chip is in an idle state, or if the baseband chip is effectively connected to the physical SIM card, the baseband chip is in an occupied state. The user may select a baseband chip in an idle state as the preset receptor baseband chip. An effective connection between the baseband chip and the physical SIM card means that the baseband chip is connected to the physical SIM card, and that a mobile data channel of the physical SIM card is in an enabled state. The user can learn of a status of the baseband chip using displayed information about the baseband chip in order to select the preset receptor baseband chip.

The terminal provides a UI such that the user can perform the preset receptor baseband chip selection operation. For example, the terminal screen displays an icon of each baseband chip, and a selection button or an option box is correspondingly set for an icon of each baseband chip. The user taps the selection button or the option box to complete the preset receptor baseband chip selection operation, and the terminal receives, using the UI, the preset receptor baseband chip selection operation that is input by the user. If the user selects a baseband chip in an occupied state as the preset receptor baseband chip, a step of disabling a mobile data channel of a physical SIM card is further included in order to avoid an error due to interference of physical SIM card data during configuration of the target virtual SIM card data. The physical SIM card is connected to the preset receptor baseband chip.

A UI provides an interface for the user to perform a selection operation, and each selection item corresponds to an identifier of a selected object. In this embodiment, each baseband chip option provided by the terminal UI respectively corresponds to an identifier of each baseband chip. The terminal receives the preset receptor baseband chip selection operation that is input by the user on the terminal, obtains, according to the preset receptor baseband chip selection operation, the identifier of the baseband chip selected by the user, and determines the baseband chip corresponding to the identifier as the preset receptor baseband chip.

Step S104 may be performed before step S101, or may be performed between step S101 and step S102, or may be performed between step S102 and step S103.

Step S105: Configure the target virtual SIM card data in the preset receptor baseband chip of the terminal.

A process of configuring the target virtual SIM card data in the preset receptor baseband chip is consistent with a process of configuring physical SIM card data in a baseband chip. When using a physical SIM card, the terminal obtains physical SIM card data using a mobile data channel of the physical SIM card, and then configures the read data in the baseband chip. In the technical solutions of the present disclosure, the received target virtual SIM card data is directly configured in the preset receptor baseband chip, and an area in which the target virtual SIM card data is configured in the preset receptor baseband chip is the same as an area in which the physical SIM card data is configured in the baseband chip. The target virtual SIM card data instead of the physical SIM card data is configured in the baseband chip, and this is equivalent to replacing a physical SIM card with a physical SIM card. The target virtual SIM card data includes target virtual SIM card authentication information, and the terminal can access the data network according to the authentication information.

The physical SIM card needs to be inserted into a SIM card slot of the terminal after the terminal is powered off. Therefore, the baseband chip can complete reading the physical SIM card data only in a start-up process after the terminal is restarted, and configure the physical SIM card data in the baseband chip after the reading. The target virtual SIM card data is directly obtained by the terminal from the network platform using a communication link. In this case, in an operation process of the terminal, the terminal configures the received target virtual SIM card data in the preset receptor baseband chip, and writes the target virtual SIM card data to a SIM card data configuration area in the preset receptor baseband chip. The terminal does not need to be restarted in this process. In an application scenario, if no SIM card data is written to the SIM card data configuration area in the preset receptor baseband chip, for example, a preset receptor baseband chip of a newly bought or a reset terminal, the terminal needs to be restarted after the target virtual SIM card data is written to the preset receptor baseband chip such that the terminal completes setting an environment parameter related to a SIM card to form an application environment of the target virtual SIM card data, and the target virtual SIM card data takes effect. In another application scenario, physical SIM card data or historical virtual SIM card data is already written to the SIM card data configuration area in the preset receptor baseband chip. In this case, the target virtual SIM card data may directly cover the existing physical SIM card data or the historical virtual SIM card data. Because the application environment is already configured, the terminal does not need to be restarted. However, for some terminals, although the terminals do not need be restarted, baseband chips or modules in which SIM card data configuration areas in the baseband chips are located need to be restarted, and for some terminals having hot patching mechanisms, the terminals do not need be restarted, and baseband chips or modules in which SIM card data configuration areas in the baseband chips are located do not need be restarted, either. For the latter application scenario, if the preset receptor baseband chip is connected to the physical SIM card, and the mobile data channel of the physical SIM card is in an enabled state, the mobile data channel of the physical SIM card needs to be first disabled.

According to the technical solutions provided in this embodiment, after generating a virtual SIM card application request, a terminal sends the virtual SIM card application request to a network platform, then receives target virtual SIM card data returned by the network platform to complete online application for a virtual SIM card, and configures a target virtual SIM card in a baseband chip. This is equivalent to replacing a physical SIM card with a virtual SIM card. In this way, a user does not need to buy a SIM card from an operator, but can conveniently change a SIM card only by downloading virtual SIM card data from the network platform using a network, regardless of a location of the user (for example, the location of the user is located is far away from an operator) and time (for example, the operator is not in business hours). In addition, according to the method provided in this embodiment, the user can designate a preset receptor baseband chip, and the user can conveniently select, with reference to displayed information about baseband chips, a baseband chip in which the target virtual SIM card data is configured, and does not need to repeatedly detach and mount a SIM card slot of the terminal for confirmation. The user can select a baseband chip in an occupied state as the preset receptor baseband chip according to a need, and replace an unwanted physical SIM card with a virtual SIM card, or may select a baseband chip in an idle state as the preset receptor baseband chip to conveniently use both the physical SIM card and the virtual SIM card.

Figure 2:
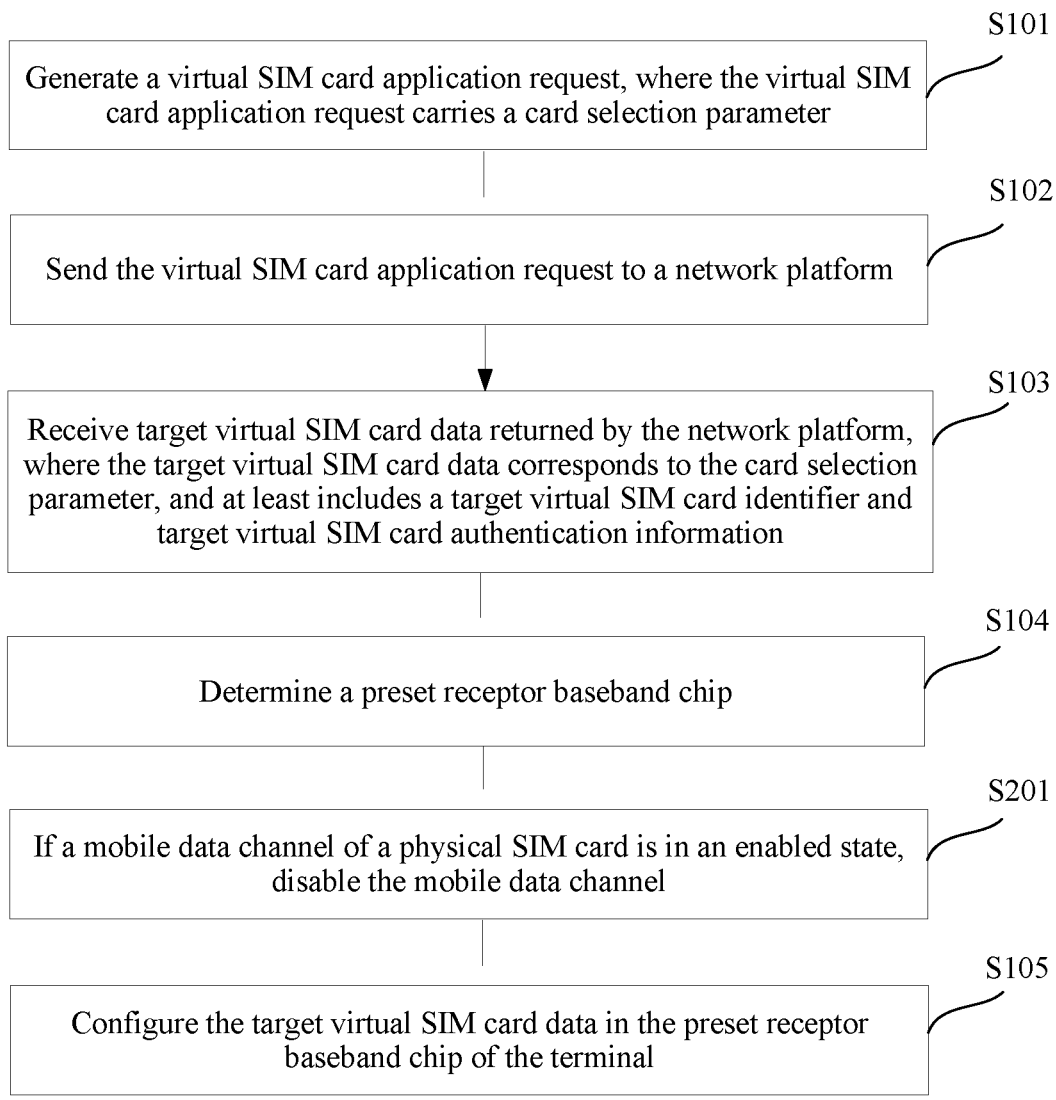
FIG. 2 is a schematic flowchart of another communication control method applied to a terminal according to an embodiment of the present disclosure.

Referring to FIG. 2, FIG. 2 is a schematic flowchart of another communication control method according to an embodiment of the present disclosure. The method is applied to a terminal, and on the basis of the embodiment shown in FIG. 1, the method may further include the following step before step S105 and after step S104.

Step S201: If a mobile data channel of a physical SIM card is in an enabled state, disable the mobile data channel, where the physical SIM card is connected to the preset receptor baseband chip.

After the preset receptor baseband chip is determined in step S104, it may be first detected in step S201 whether the mobile data channel of the physical SIM card connected to the preset receptor baseband chip is in an enabled state. The detection may be implemented by detecting whether data is successfully read from the mobile data channel. If the data is successfully read from the mobile data channel, the mobile data channel is in an enabled state, or if the data is not successfully read from the mobile data channel, the mobile data channel is in a disabled state. Generally, after a baseband chip of the terminal is connected to the physical SIM card, it may be learned, by detecting whether a data output related pin of the physical SIM card is enabled, whether the mobile data channel of the physical SIM card is in an enabled state. If the preset receptor baseband chip is not connected to the physical SIM card, a detection result is null, and the step of disabling the mobile data channel does not need to be performed. In this embodiment, regardless of whether the preset receptor baseband chip is in an occupied state, it is detected whether the mobile data channel of the physical SIM card needs to be disabled. This can avoid a target virtual SIM card data configuration error caused because the mobile data channel of the physical SIM card connected to the preset receptor baseband chip is not disabled after a user selects a baseband chip that is incorrectly displayed in an idle state as the preset receptor baseband chip when the baseband chip in an occupied state is incorrectly displayed in an idle state.

A terminal with a single baseband chip may also perform step S201 before performing step S105 to ensure that target virtual SIM card data is not affected by the physical SIM card when being configured in the preset receptor baseband chip. For the terminal with the single baseband chip, if an operation step of the user is to first detach the physical SIM card and restart the terminal, and then the terminal performs step S101 to step S105, the terminal does not need to perform step S201 before performing step S105.

Figure 3:
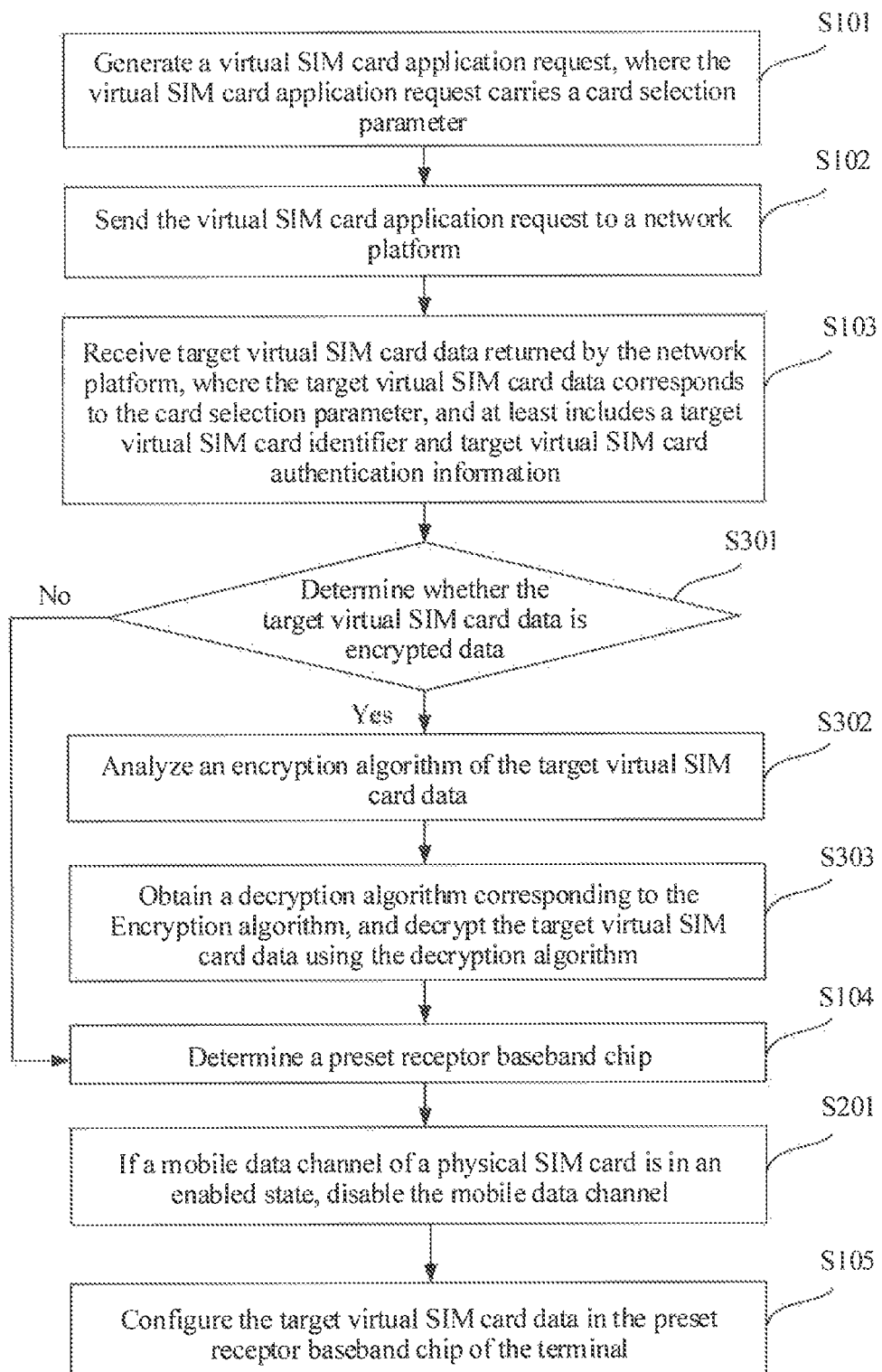
FIG. 3 is a schematic flowchart of still another communication control method applied to a terminal according to an embodiment of the present disclosure.

Referring to FIG. 3, FIG. 3 is a flowchart of still another communication control method according to an embodiment of the present disclosure. The method is applied to a terminal, and on the basis of the embodiment shown in FIG. 2, the method may further include the following steps before step S104 and after step S103.

Step S301: Determine whether the target virtual SIM card data is encrypted data.

Step S302: If the target virtual SIM card data is the encrypted data, analyze an encryption algorithm of the target virtual SIM card data.

Step S303: Obtain a decryption algorithm corresponding to the encryption algorithm, and decrypt the target virtual SIM card data using the decryption algorithm.

To ensure security of the target virtual SIM card data, and prevent the target virtual SIM card data from being rewritten or destroyed, the target virtual SIM card data may be encrypted on a side of a network platform. If the target virtual SIM card data received by the terminal is the encrypted data, the target virtual SIM card data needs to be decrypted accordingly. A protocol may be established between the network platform and the terminal for data encryption and decryption. The network platform encrypts the target virtual SIM card data according to the protocol and using a specified data encryption method and a decryption method corresponding to the encryption method is preset on the terminal. According to the protocol, the received target virtual SIM card data is encrypted by default, and is decrypted using a preset default decryption method. In this case, step S301 and step S302 may not be performed.

The network platform may encrypt the target virtual SIM card data using multiple methods, for example, a Data Encryption Standard (DES) algorithm or an Advanced Encryption Standard (AES) algorithm. An encryption algorithm of the network platform for the target virtual SIM card data may not be unique, and different encryption algorithms are used for different target virtual SIM card data.

In an implementation manner, the network platform adds an algorithm identifier to the encrypted target virtual SIM card data, and the algorithm identifier is used to represent an encryption algorithm used when the network platform encrypts the target virtual SIM card data. After the terminal receives the encrypted target virtual SIM card data, it is determined in step S301 whether the received encrypted target virtual SIM card data includes an algorithm identifier, if the target virtual SIM card data includes the algorithm identifier, the target virtual SIM card data is the encrypted data, the encryption algorithm of the target virtual SIM card data is obtained according to the algorithm identifier in step S302, and then the decryption algorithm corresponding to the encryption algorithm is found from decryption algorithms that are prestored on the terminal, and the target virtual SIM card data is decrypted using the decryption algorithm corresponding to the encryption algorithm in step S303, or if a result obtained by means of determining in step S301 is that the target virtual SIM card data does not include the algorithm identifier, it is determined that the target virtual SIM card data is not encrypted.

In another implementation manner, after the terminal receives the target virtual SIM card data, a specific execution process of step S301 is to read a target virtual SIM card identifier in the target virtual SIM card data. The target virtual SIM card identifier of the encrypted target virtual SIM card data is also encrypted and cannot be directly read. Therefore, in step S301, if a target virtual SIM card identifier that meets a preset format cannot be read, it is determined that the target virtual SIM card data is the encrypted data, or if a target virtual SIM card identifier that meets a preset format can be read, it is determined that the target virtual SIM card data is not encrypted. The preset format of the target virtual SIM card identifier is preset in the network platform and the terminal, and formats of the target virtual SIM card identifiers in the network platform and the terminal are the same. If a determining result in step S301 is that the target virtual SIM card data is the encrypted data, in step S302, an attempt to decrypt the target virtual SIM card data is made by successively using the decryption algorithms that are prestored on the terminal, and by detecting whether a target virtual SIM card identifier obtained by means of decryption meets a preset format, a decryption algorithm corresponding to the target virtual SIM card identifier that meets the preset format can be obtained. An encryption algorithm corresponding to the decryption algorithm is the encryption algorithm of the target virtual SIM card data. In addition, in step 303, the decryption algorithm of the target virtual SIM card data can also be obtained, and the target virtual SIM card data is decrypted using a decryption algorithm using which the target virtual SIM card identifier meeting the preset format can be obtained.

Step S301 to step S303 need to be performed after step S103 and before step S105, and further, may be performed after step S103 and before step S201, or may be performed after step S201 and before step S105.

Encryption of the target virtual SIM card data can ensure security of the target virtual SIM card data. To ensure transmission security of the target virtual SIM card data, and prevent a data loss, in the technical solutions provided in the present disclosure, secure data transmission may be further performed between the data network platform and the terminal using a method that includes but is not limited to the methods, such as a Hypertext Transfer Protocol Secure (HTTPS) network transmission encryption method and a virtual private network (VPN) dedicated link transmission method.

Figure 4:
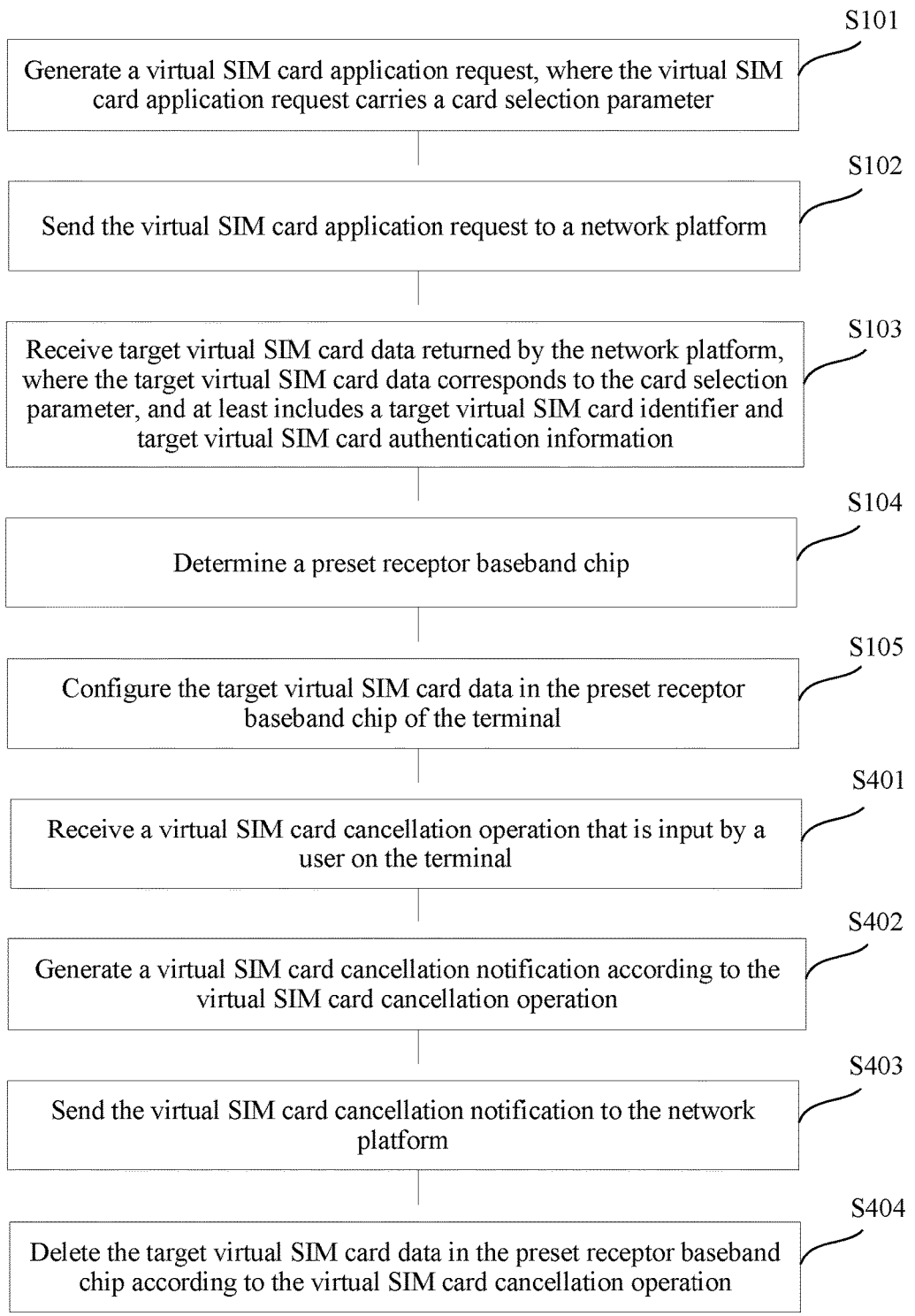
FIG. 4 is a schematic flowchart of still another communication control method applied to a terminal according to an embodiment of the present disclosure.

Referring to FIG. 4, FIG. 4 is a schematic flowchart of still another communication control method according to an embodiment of the present disclosure. The method is applied to a terminal, and on the basis of the embodiment shown in FIG. 1, the method may further include the following steps after step S105.

Step S401: Receive a virtual SIM card cancellation operation that is input by a user on the terminal.

Step S402: Generate a virtual SIM card cancellation notification according to the virtual SIM card cancellation operation.

Step S403: Send the virtual SIM card cancellation notification to the network platform, where the virtual SIM card cancellation notification carries a target virtual SIM card identifier such that the network platform resets invalid target virtual SIM card data in the network platform to valid, and the target virtual SIM card data corresponds to the target virtual SIM card identifier.

Step S404: Delete the target virtual SIM card data in a preset receptor baseband chip according to the virtual SIM card cancellation operation.

After configuring the target virtual SIM card data in the preset receptor baseband chip, the terminal can access a data network using the target virtual SIM card data, to implement functions such as call and Internet surfing. The terminal may provide a UI such that the user performs the virtual SIM card cancellation operation when the user needs to pause or finish using a virtual SIM card. For example, a terminal screen displays a virtual SIM card cancellation button, and the user taps the button to perform the virtual SIM card cancellation operation. From a perspective of the terminal, after receiving the virtual SIM card cancellation operation that is input by the user, the terminal deletes the target virtual SIM card data in the preset receptor baseband chip, thereby completing virtual SIM card cancellation. From a perspective of the network platform, after the target virtual SIM card data is sent to a terminal in response to a virtual SIM card application request of the terminal, the target virtual SIM card data cannot be sent to another terminal. If the target virtual SIM card data is sent to another terminal, repeated authentication occurs. Consequently, the user cannot normally use a data network service. Therefore, after sending the target virtual SIM card data to the terminal, the network platform needs to perform invalidation processing on the target virtual SIM card data such that the network platform does not send the target virtual SIM card data to another terminal, that is, ensures that one piece of target virtual SIM card data corresponds to only one terminal.

An implementation manner for performing invalidation processing on the target virtual SIM card data by the network platform is to delete the target virtual SIM card data, that is, to never reuse the target virtual SIM card data. This manner can thoroughly prevent the target virtual SIM card data from being resent to different terminals. However, the network platform needs to constantly generate new target virtual SIM card data to meet requirements of different terminals, and this wastes resources. Another implementation manner is to set the target virtual SIM card data to "reading forbidden" or mark the target virtual SIM card data as "used" in the network platform after the target virtual SIM card data is sent to the terminal. Target virtual SIM card data that is set to "reading forbidden" or marked as "used" cannot be resent. In this case, to save data resources and improve resource utilization, after the terminal deletes the target virtual SIM card data, that is, cancels using the virtual SIM card, the network platform may recycle the target virtual SIM card data, to make the target virtual SIM card data readable or available again.

To enable the network platform to recycle the target virtual SIM card data, after receiving the virtual SIM card cancellation operation that is input by the user, the terminal obtains the target virtual SIM card identifier of the target virtual SIM card data in the preset receptor baseband chip, and sends, to the network platform, the virtual SIM card cancellation notification that carries the target virtual SIM card identifier. The virtual SIM card cancellation notification is generated according to a packet format specified by a protocol between the terminal and the network platform. Therefore, after receiving the virtual SIM card cancellation notification sent by the terminal, the network platform can find corresponding target virtual SIM card data according to the target virtual SIM card identifier in the virtual SIM card cancellation notification, and recycle the target virtual SIM card data. After sending the virtual SIM card cancellation notification to the network platform, the terminal deletes the target virtual SIM card data in the preset receptor baseband chip.

To help the user to observe an application and use status of the virtual SIM card, a corresponding icon may be displayed on the terminal screen to visualize a related process and status. For example, after the target virtual SIM card data is configured in the preset receptor baseband chip of the terminal, a virtual SIM card icon and related information of corresponding virtual SIM card data are displayed on the terminal screen, to remind the user that the virtual SIM card is already configured for the terminal, and help the user to view related information of the configured virtual SIM card. Correspondingly, after receiving the virtual SIM card cancellation operation that is input by the user on the terminal, the terminal may hide or remove the virtual SIM card icon on the terminal screen to remind the user that the virtual SIM card is already cancelled. In addition, an animated icon may be further displayed on the terminal screen to represent a receiving progress of the target virtual SIM card data, or an animated network signal icon may be further displayed to represent a network signal strength when the terminal is connected to the network platform. In conclusion, an icon or an animated icon may be displayed on the terminal screen according to a need to visualize a process from virtual SIM card application to virtual SIM card cancellation and various variables and statuses of the variables that are involved in this process.

Figure 5:
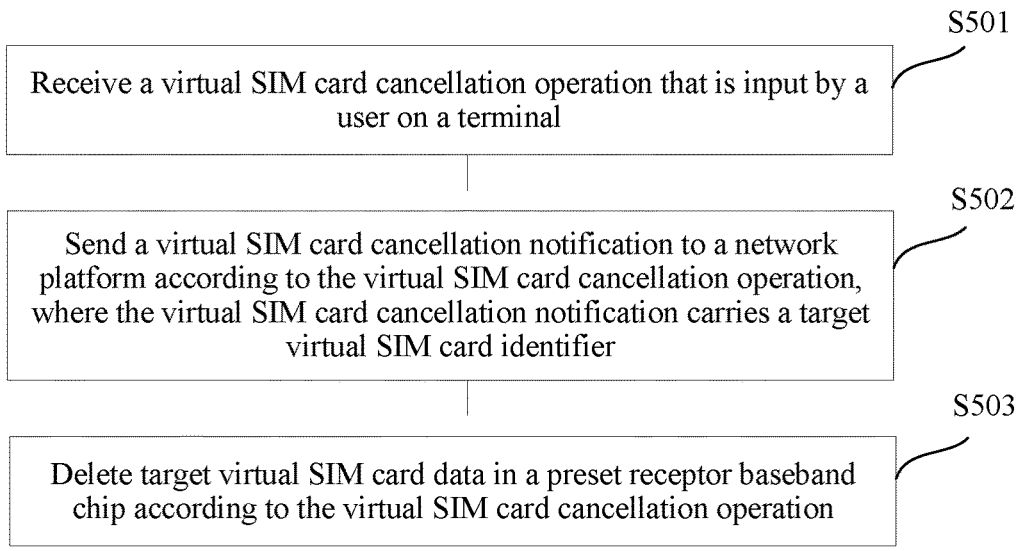
FIG. 5 is a schematic flowchart of a virtual SIM card cancellation method applied to a terminal for which virtual SIM card data is already configured according to an embodiment of the present disclosure.

Referring to FIG. 5, FIG. 5 is a schematic flowchart of a virtual SIM card cancellation method according to an embodiment of the present disclosure. The method is applied to a terminal for which virtual SIM card data is already configured, the method is based on the communication control method shown in FIG. 1, and as shown in FIG. 5, the method may include the following steps.

Step S501: Receive a virtual SIM card cancellation operation that is input by a user on the terminal.

Step S502: Send a virtual SIM card cancellation notification to a network platform according to the virtual SIM card cancellation operation, where the virtual SIM card cancellation notification carries a target virtual SIM card identifier such that the network platform resets invalid target virtual SIM card data in the network platform to valid, and the target virtual SIM card data corresponds to the target virtual SIM card identifier.

Step S503: Delete the target virtual SIM card data in a preset receptor baseband chip according to the virtual SIM card cancellation operation.

After configuring the target virtual SIM card data in the preset receptor baseband chip, the terminal can access a data network using the target virtual SIM card data to implement functions such as call and Internet surfing. The terminal provides a UI such that the user performs the virtual SIM card cancellation operation when the user needs to pause or finish using a virtual SIM card. For example, a terminal screen displays a virtual SIM card cancellation button, and the user taps the button to perform the virtual SIM card cancellation operation. From a perspective of the terminal, after receiving the virtual SIM card cancellation operation that is input by the user, the terminal deletes the target virtual SIM card data in the preset receptor baseband chip, thereby completing virtual SIM card cancellation. From a perspective of the network platform, after the target virtual SIM card data is sent to a terminal in response to a virtual SIM card application request of the terminal, the target virtual SIM card data cannot be sent to another terminal. If the target virtual SIM card data is sent to another terminal, repeated authentication occurs. Consequently, the user cannot normally use a data network service. Therefore, after sending the target virtual SIM card data to the terminal, the network platform needs to perform invalidation processing on the target virtual SIM card data such that the network platform does not send the target virtual SIM card data to another terminal, that is, ensures that one piece of target virtual SIM card data corresponds to only one terminal.

An implementation manner for performing invalidation processing on the target virtual SIM card data by the network platform is to delete the target virtual SIM card data, that is, to never reuse the target virtual SIM card data. This manner can thoroughly prevent the target virtual SIM card data from being resent to different terminals, and is quite conducive to user privacy protection. Alternatively, to protect privacy, the user wants the network platform to recycle corresponding target virtual SIM card data after a period of time since the virtual SIM card is cancelled. Therefore, in an implementation manner of this embodiment of this application, the virtual SIM card cancellation notification further carries a virtual SIM card cancellation parameter, and the virtual SIM card cancellation parameter may be a target virtual SIM card data recycling delay time. After receiving the virtual SIM card cancellation notification, the network platform recycles, according to the virtual SIM card cancellation parameter, the corresponding target virtual SIM card data after a delay of a period of time, and a delay time length is determined by the target virtual SIM card data recycling delay time. Alternatively, the virtual SIM card cancellation parameter may be a character string that has a specific meaning and that is specified between the terminal and the network platform such that the network platform deletes the invalid target virtual SIM card data in the network platform according to the virtual SIM card cancellation parameter. For example, the virtual SIM card cancellation parameter is a character string "simabandon." After receiving the virtual SIM card cancellation notification, the network platform reads the character string "simabandon,", and then deletes the corresponding target virtual SIM card data in the network platform.

Although deleting the invalid target virtual SIM card data in the network platform is conducive to privacy protection, the network platform needs to constantly generate new target virtual SIM card data to meet requirements of different terminals, and this wastes resources. Another implementation manner is to set the target virtual SIM card data to "reading forbidden" or mark the target virtual SIM card data as "used" in the network platform after the target virtual SIM card data is sent to the terminal. Target virtual SIM card data that is set to "reading forbidden" or marked as "used" cannot be resent. In this case, to save data resources and improve resource utilization, after the terminal deletes the target virtual SIM card data, that is, cancels using the virtual SIM card, the network platform may recycle the target virtual SIM card data to make the target virtual SIM card data readable or available again.

To enable the network platform to recycle the target virtual SIM card data, after receiving the virtual SIM card cancellation operation that is input by the user, the terminal obtains the target virtual SIM card identifier of the target virtual SIM card data in the preset receptor baseband chip, and sends, to the network platform, the virtual SIM card cancellation notification that carries the target virtual SIM card identifier. The virtual SIM card cancellation notification is generated according to a packet format specified by a protocol between the terminal and the network platform. Therefore, after receiving the virtual SIM card cancellation notification sent by the terminal, the network platform can find corresponding target virtual SIM card data according to the target virtual SIM card identifier in the virtual SIM card cancellation notification, and recycle the target virtual SIM card data. After sending the virtual SIM card cancellation notification to the network platform, the terminal deletes the target virtual SIM card data in the preset receptor baseband chip.

To help the user to learn of related information such as a virtual SIM card use time and virtual SIM card service settlement information, the network platform sends a virtual SIM card cancellation receipt to the terminal after receiving the virtual SIM card cancellation notification. The virtual SIM card cancellation receipt may include the virtual SIM card use time and the virtual SIM card service settlement information that correspond to the target virtual SIM card identifier, and the virtual SIM card service settlement information includes data network service charges, a virtual SIM card balance, and the like. After receiving the virtual SIM card cancellation receipt sent by a server, the terminal displays the virtual SIM card cancellation receipt for the user to view.

In addition, to help the user to observe a use status of the virtual SIM card, a corresponding icon may be displayed on the terminal screen to visualize a related process and status. For example, after the target virtual SIM card data is configured in the preset receptor baseband chip of the terminal, a virtual SIM card icon is displayed on the terminal screen to remind the user that the virtual SIM card is already configured for the terminal. After receiving the virtual SIM card cancellation operation that is input by the user on the terminal, the terminal hides or removes the virtual SIM card icon on the terminal screen to remind the user that the virtual SIM card is already cancelled.

Figure 6:
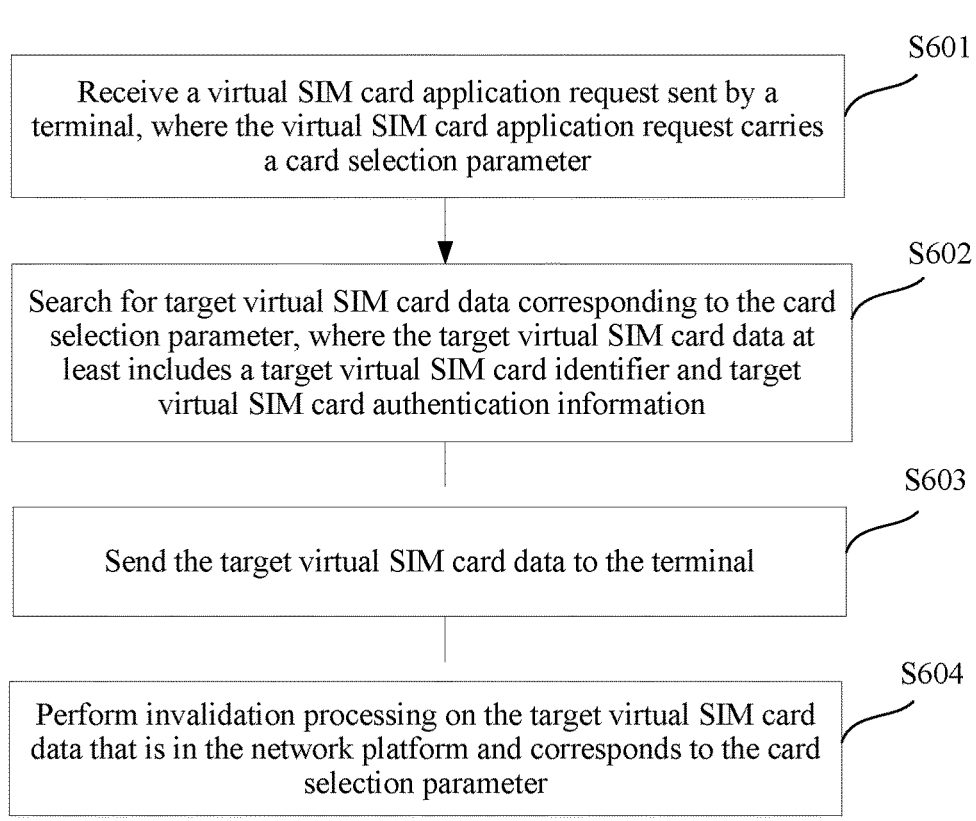
FIG. 6 is a schematic flowchart of a communication control method applied to a network platform according to an embodiment of the present disclosure.

Referring to FIG. 6, FIG. 6 is a schematic flowchart of a communication control method according to an embodiment of the present disclosure. The method is applied to a network platform, and as shown in FIG. 6, the method may include the following steps.

Step S601: Receive a virtual SIM card application request sent by a terminal, where the virtual SIM card application request carries a card selection parameter.

Step S602: Search for target virtual SIM card data corresponding to the card selection parameter, where the target virtual SIM card data at least includes a target virtual SIM card identifier and target virtual SIM card authentication information.

Step S603: Send the target virtual SIM card data to the terminal.

Step S604: Perform invalidation processing on the target virtual SIM card data that is in the network platform and corresponds to the card selection parameter.

If a data network platform is used as the network platform in the present disclosure, because the data network platform can dynamically update location information of the terminal, the card selection parameter sent by the terminal may be null. The data network platform returns local virtual SIM card data to the terminal according to a current location of the terminal, that is, if the card selection parameter received by the data network platform is null, the data network platform returns, to the terminal by default, local virtual SIM card data corresponding to the current location of the terminal.

After receiving the virtual SIM card application request sent by the terminal, the network platform reads the card selection parameter in the virtual SIM card application request. In addition to a current geographic location of the terminal or a data network service region, the card selection parameter may further include any one of or a combination of any two or more of a device type of the terminal, a data network service price, or a data network service time limit. Alternatively, the card selection parameter may be any one of or a combination of any two or more of a current geographic location, a device type of the terminal, a data network service price, or a data network service time limit. Alternatively, the card selection parameter is any one of or a combination of any two or more of a data network service region, a data network service price, or a data network service time limit.

The network platform stores virtual SIM card data. In an implementation manner, the virtual SIM card data is classified for storing and may be classified at multiple levels. For example, a first-level classification is a data network service region, a second-level classification is a device type of the terminal, a third-level classification is a data network service price, and a fourth-level classification is a data network service time limit. Correspondingly, in step S602, the network platform compares the obtained card selection parameter with a classification label of the virtual SIM card data. If a classification label corresponding to virtual SIM card data conforms to all card selection parameters, the virtual SIM card data meets a condition, and the network platform returns the virtual SIM card data to the terminal as the target virtual SIM card data. For example, if the card selection parameter includes that the data network service region: Hong Kong; the device type of the terminal: ANDROID; the data network service price: 50 Yuans (¥)/month; and the data network service time limit: 2 months, virtual SIM card data in which the data network service region is Beijing by classification, the device type of the terminal is ANDROID by classification, the data network service price is 50 ¥/month by classification, and the data network service time limit is 2 months by classification in the network platform meets the condition. In another implementation manner, an attribute entry is set for each piece of virtual SIM card data, and the attribute entry is used to describe a data network service region, a data network service price, and a data network service time limit that correspond to the virtual SIM card data, and/or a device type of the terminal that is applicable to the virtual SIM card data. Correspondingly, in step S602, the network platform compares the obtained card selection parameter with an attribute entry of the virtual SIM card data in the network platform. If the card selection parameter is a subset of the attribute entry, the virtual SIM card data is successfully found, and virtual SIM card data corresponding to the attribute entry is used as the target virtual SIM card data. For example, if the card selection parameter includes that the service region: Beijing; and the data network service price: 30 ¥/month, and an attribute entry of virtual SIM card data includes that the service region: Beijing; the data network service price: 30 ¥/month; and the data network service time limit: 1 month, the virtual SIM card data meets the condition, and may be used as the target virtual SIM card data. It should be noted that, in the latter implementation manner, there may be multiple pieces of virtual SIM card data in the network platform that meet a condition specified by the card selection parameter. For example, when the card selection parameter includes that the data network service region: Beijing; and the data network service price: 30 ¥/month, both virtual SIM card data whose attribute entry includes that the data network service region: Beijing; the data network service price: 30 ¥/month; and the data network service time limit: 1 month and virtual SIM card data whose attribute entry includes that the data network service region: Beijing; the data network service price: 30 ¥/month; and the data network service time limit: 2 months meet the condition. In this case, the network platform randomly selects one piece of virtual SIM card data from the multiple pieces of virtual SIM card data that meet the condition, and returns the virtual SIM card data to the terminal as the target virtual SIM card data. If the virtual SIM card data corresponding to the card selection parameter cannot be found in the network platform, the search fails. In this case, the network platform may send a data search failure notification to the terminal to remind the user to modify the card selection parameter or to abandon the application.

After the network platform sends the target virtual SIM card data to the terminal, the target virtual SIM card data cannot be sent to another terminal. If the target virtual SIM card data is sent to another terminal, repeated authentication occurs. Consequently, the user cannot normally use a data network service. Therefore, after sending the target virtual SIM card data to the terminal, the network platform needs to perform invalidation processing on the target virtual SIM card data. The invalidation processing is to disqualify the target virtual SIM card data from being sent to another terminal such that the network platform does not send the target virtual SIM card data to another terminal. An implementation manner for performing invalidation processing on the target virtual SIM card data by the network platform is to delete the target virtual SIM card data. This manner can thoroughly prevent the target virtual SIM card data from being resent to different terminals, and is also conducive to user privacy protection. However, the network platform needs to constantly generate new target virtual SIM card data to meet new requirements of virtual SIM card application, and this wastes resources.

If the virtual SIM card cancellation notification sent by the terminal carries the virtual SIM card cancellation parameter, and if the virtual SIM card cancellation parameter is a target virtual SIM card data recycling delay time, after receiving the virtual SIM card cancellation notification, the network platform recycles, according to the virtual SIM card cancellation parameter, corresponding target virtual SIM card data after a delay of a time length determined by the target virtual SIM card data recycling delay time. If the virtual SIM card cancellation parameter is a character string that has a specific meaning and that is specified between the terminal and the network platform, for example, "simabandon" such that the network platform deletes the invalid target virtual SIM card data in the network platform according to the virtual SIM card cancellation parameter, the network platform deletes the corresponding target virtual SIM card data in the network platform after receiving the virtual SIM card cancellation notification.

Another implementation manner for performing invalidation processing on the target virtual SIM card data by the network platform is to forbid, after the target virtual SIM card data is sent to the terminal, the target virtual SIM card data from being reused in the network platform. A specific implementation manner may be to set the target virtual SIM card data to "reading forbidden" or mark the target virtual SIM card data as "used."

Still another implementation manner for performing invalidation processing on the target virtual SIM card data by the network platform is to set an available virtual SIM card data resource pool and an unavailable virtual SIM card data resource pool in the network platform. Virtual SIM card data in the available virtual SIM card data resource pool is allowed to be used and sent to the terminal, and virtual SIM card data in the unavailable virtual SIM card data resource pool is not allowed to be used and sent to the terminal. The network platform searches only the available virtual SIM card data resource pool for the target virtual SIM card data according to the card selection parameter, and after sending the target virtual SIM card data to the terminal, allocates the target virtual SIM card data to the unavailable virtual SIM card data resource pool.

It should be noted that the network platform searches available virtual SIM card data for the target virtual SIM card data according to the card selection parameter. The available virtual SIM card data is virtual SIM card data that is not forbidden from being used in the network platform, for example, virtual SIM card data that is not set to "using forbidden," virtual SIM card data that is not marked as "used" (or marked as "unused"), or virtual SIM card data in the available virtual SIM card data resource pool.

If invalidation processing is not deleting the target virtual SIM card data in the network platform to save data resources and improve resource utilization, after the terminal deletes the target virtual SIM card data, that is, cancels using the virtual SIM card, the network platform may recycle the target virtual SIM card data to make the target virtual SIM card data available again.

After receiving the virtual SIM card cancellation notification, the network platform may further send a virtual SIM card cancellation receipt to the terminal. The virtual SIM card cancellation receipt may include the virtual SIM card use time and the virtual SIM card service settlement information that correspond to the target virtual SIM card identifier, and the virtual SIM card service settlement information includes data network service charges, a virtual SIM card balance, and the like. This helps the user to learn of related information of virtual SIM card use.

According to the communication control method that is applied to a network platform and is provided in this embodiment, in response to a virtual SIM card application request of a terminal, corresponding target virtual SIM card data is found according to a card selection parameter in the virtual SIM card application request, and then the target virtual SIM card data is returned to the terminal in order to implement online application for a SIM card, and help a user to change a SIM card. In addition, invalidation processing is performed on the target virtual SIM card data that is already returned to the terminal, to avoid a problem of repeated authentication on different terminals caused because virtual SIM card data is repeatedly sent.

Figure 7:
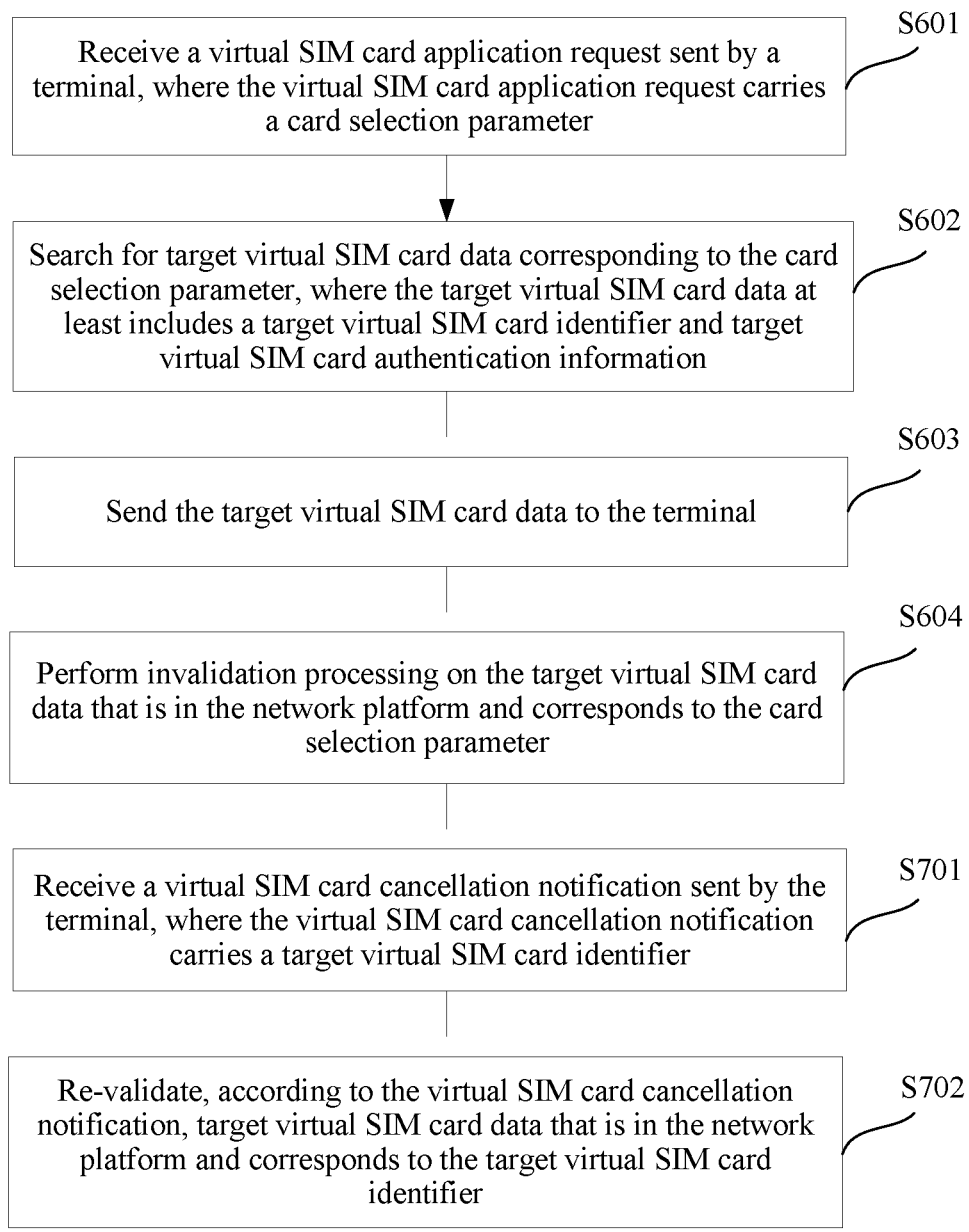
FIG. 7 is a schematic flowchart of another communication control method applied to a network platform according to an embodiment of the present disclosure.

Referring to FIG. 7, FIG. 7 is a schematic flowchart of another communication control method according to an embodiment of the present disclosure. The method is applied to a network platform, and on the basis of the embodiment shown in FIG. 6, the method may further include the following steps after step S604.

Step S701: Receive a virtual SIM card cancellation notification sent by the terminal, where the virtual SIM card cancellation notification carries a target virtual SIM card identifier.

Step S702: Re-validate, according to the virtual SIM card cancellation notification, target virtual SIM card data that is in the network platform and corresponds to the target virtual SIM card identifier.

If invalidation processing performed by the network platform is not deleting the target virtual SIM card data, to avoid a resource waste and improve resource utilization, the network platform may recycle the target virtual SIM card data on which invalidation processing is performed. The recycling is re-validating the corresponding target virtual SIM card data in the network platform after a user cancels using a virtual SIM card such that the network platform may send re-validated target virtual SIM card data to a terminal that applies for a virtual SIM card.

After the user performs the virtual SIM card cancellation operation on the terminal, the terminal sends the virtual SIM card cancellation notification to the network platform, and adds the target virtual SIM card identifier in the target virtual SIM card data to the cancellation notification. After receiving the cancellation notification, the network platform performs a target virtual SIM card data recycling process. This process further includes reading the target virtual SIM card identifier in the cancellation notification, searching for the target virtual SIM card data corresponding to the target virtual SIM card identifier, and then re-validating the target virtual SIM card data. Re-validating the target virtual SIM card data is re-qualifying the target virtual SIM card data for being sent to another terminal such that the network platform can send the target virtual SIM card data to another terminal.

An implementation manner for performing invalidation processing on the target virtual SIM card data by the network platform is to set the target virtual SIM card data to "reading forbidden" or mark the target virtual SIM card data as "used." Correspondingly, re-validating the target virtual SIM card data is setting the target virtual SIM card data to "reading allowed" or marking the target virtual SIM card data as "unused." Another implementation manner for performing invalidation processing on the target virtual SIM card data by the network platform is to set an available virtual SIM card data resource pool and an unavailable virtual SIM card data resource pool in the network platform. After sending, to the terminal, target virtual SIM card data that is found from the available virtual SIM card data resource pool, the network platform allocates the target virtual SIM card data to the unavailable virtual SIM card data resource pool. Correspondingly, re-validating the target virtual SIM card data by the network platform is reallocating, to the available virtual SIM card data resource pool, the target virtual SIM card data that is allocated to the unavailable virtual SIM card data resource pool.

According to the communication control method that is applied to a network platform and is provided in this embodiment, after a virtual SIM card cancellation notification sent by a terminal is received, virtual SIM card data on which invalidation processing is performed is recycled, that is, invalid virtual SIM card data is re-validated in order to improve data resource utilization, and reduce resource consumption.

Figure 8:
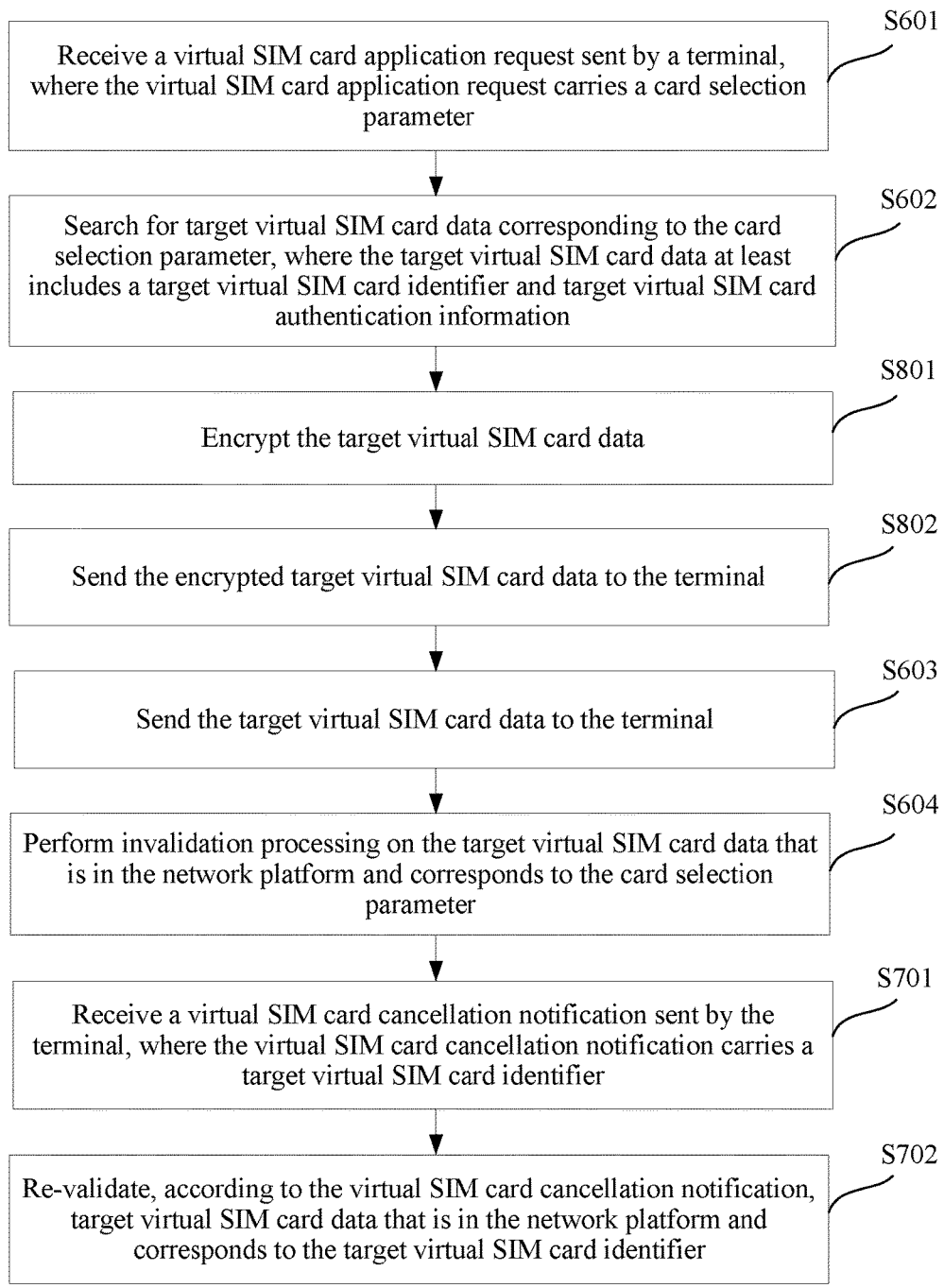
FIG. 8 is a schematic flowchart of still another communication control method applied to a network platform according to an embodiment of the present disclosure.

Referring to FIG. 8, FIG. 8 is a schematic flowchart of still another communication control method according to an embodiment of the present disclosure. The method is applied to a network platform, and on the basis of the embodiment shown in FIG. 7, as shown in FIG. 8, the method may further include the following steps after step S602 and before step S603.

Step S801: Encrypt the target virtual SIM card data.

Step S802: Send the encrypted target virtual SIM card data to the terminal.

The network platform encrypts the target virtual SIM card data. This helps to ensure security of the target virtual SIM card data and prevent the target virtual SIM card data from being rewritten or destroyed. A protocol may be established between the network platform and the terminal. The network platform encrypts the target virtual SIM card data according to the protocol and using a specified data encryption method, and a decryption method corresponding to the encryption method in the network platform is preset on the terminal. According to the protocol, the received target virtual SIM card data is encrypted by default, and is decrypted using a preset default decryption method. The network platform may encrypt the target virtual SIM card data using multiple algorithms, for example, a DES algorithm or an AES algorithm. An encryption method of the network platform for different target virtual SIM card data may not be unique. In an implementation manner, the network platform adds an algorithm identifier to the encrypted target virtual SIM card data, and the algorithm identifier is used to represent an encryption algorithm used when the network platform encrypts the target virtual SIM card data. In this way, after receiving the encrypted target virtual SIM card data, the terminal may determine, according to whether the target virtual SIM card data includes an algorithm identifier, whether the target virtual SIM card data is the encrypted data, and obtain a corresponding decryption algorithm according to the algorithm identifier to decrypt the target virtual SIM card data.

Figure 9:
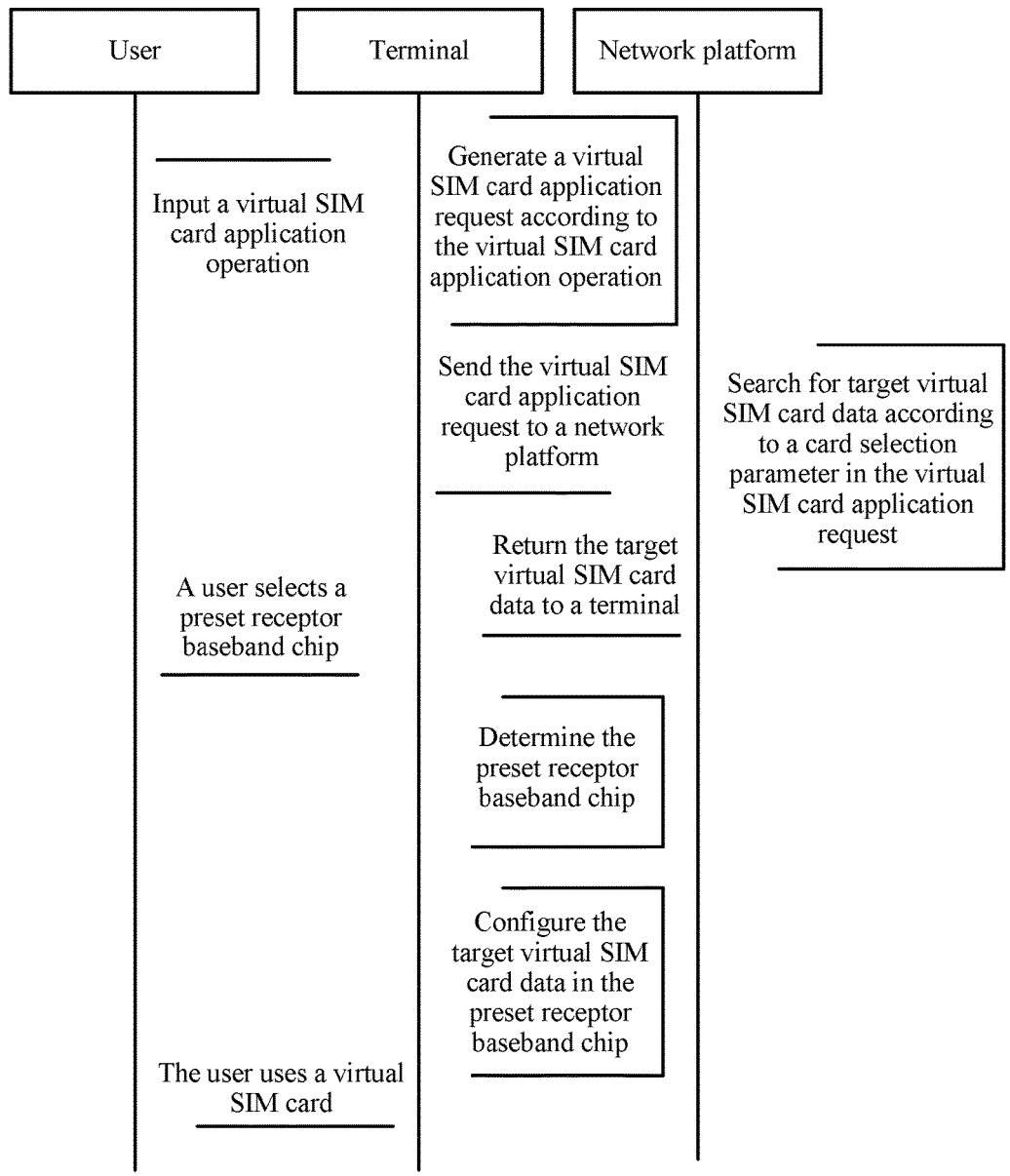
FIG. 9 is a schematic diagram of interworking between a user, a terminal, and a network platform in an implementation manner of the communication control method shown in FIG. 1.
Figure 10:
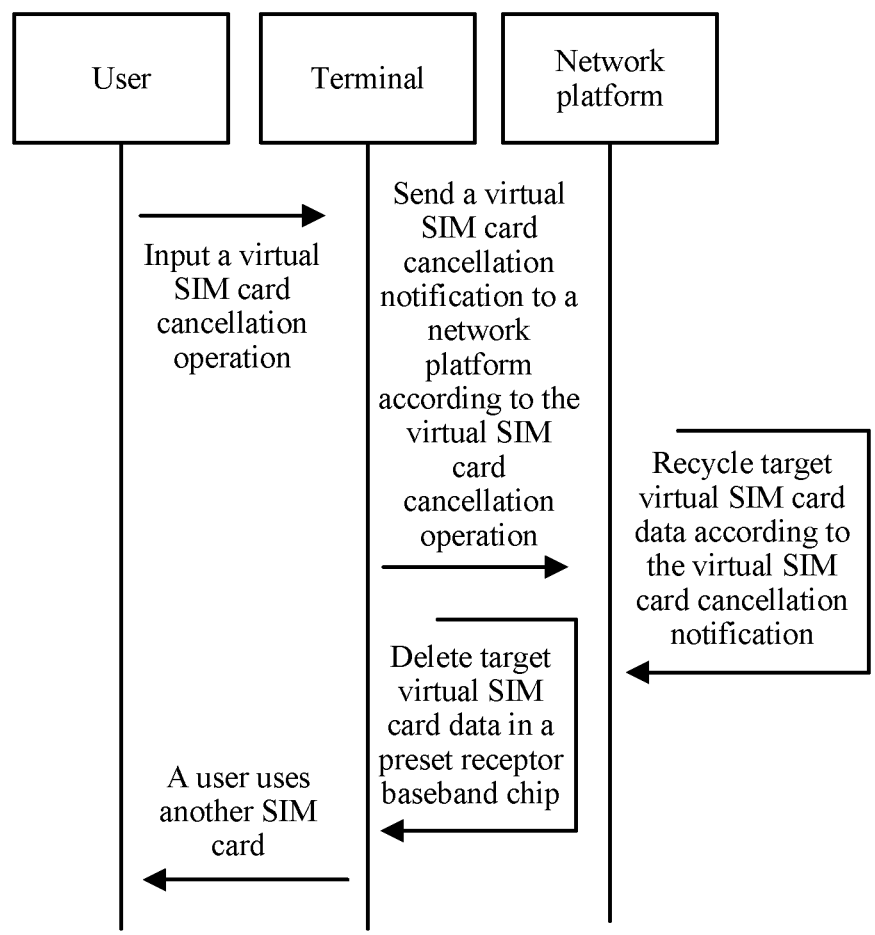
FIG. 10 is a schematic diagram of interworking between a user, a terminal, and a network platform in a virtual SIM card cancellation process in the communication control method shown in FIG. 7.

In an implementation manner of the communication control method shown in FIG. 1, a terminal receives a virtual SIM card application operation that is input by a user on the terminal, and generates a virtual SIM card application request according to the virtual SIM card application operation. FIG. 9 is a schematic diagram of interworking between a user, a terminal, and a network platform in this implementation manner. FIG. 10 is a schematic diagram of interworking between a user, a terminal, and a network platform in a virtual SIM card cancellation process in the communication control method shown in FIG. 7. FIG. 9 and FIG. 10 more clearly show operating processes of the technical solutions in the present disclosure in possible implementation manners. In FIG. 9, a user inputs a virtual SIM card application operation (including inputting a card selection parameter) on a terminal. The terminal receives the virtual SIM card application operation, generates a virtual SIM card application request (where the card selection parameter is carried in the virtual SIM card application request) according to the virtual SIM card application operation, and sends the virtual SIM card application request to a network platform. The network platform receives the virtual SIM card application request, searches for corresponding target virtual SIM card data according to the card selection parameter in the virtual SIM card application request, and returns the target virtual SIM card data to the terminal. After receiving the target virtual SIM card data, the terminal configures the target virtual SIM card data in a baseband chip of the terminal such that the user can start to use a virtual SIM card. In FIG. 10, a user inputs a virtual SIM card cancellation operation on a terminal. The terminal receives the virtual SIM card cancellation operation, and sends a virtual SIM card cancellation notification to a network platform according to the virtual SIM card cancellation operation. After receiving the virtual SIM card cancellation notification, the network platform recycles corresponding target virtual SIM card data in the network platform. After sending the virtual SIM card cancellation notification, the terminal deletes the target virtual SIM card data in a preset receptor baseband chip such that the user can use another SIM card in the preset receptor baseband chip.

Corresponding to the foregoing embodiments of the communication control method applied to a terminal, the present disclosure further provides embodiments of a communication control apparatus applied to the terminal, and corresponding to the foregoing embodiments of the communication control method applied to a network platform, the present disclosure further provides embodiments of a communication control apparatus applied to the network platform.

Figure 11:
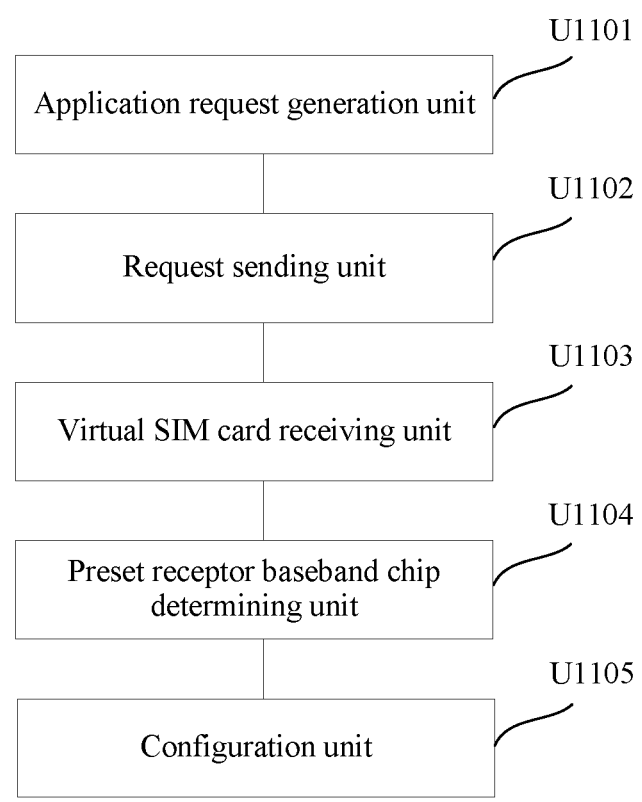
FIG. 11 is a block diagram of a communication control apparatus applied to a terminal according to an embodiment of the present disclosure.

Referring to FIG. 11, FIG. 11 is a block diagram of a communication control apparatus according to an embodiment of the present disclosure. The apparatus is applied to a terminal, and as shown in FIG. 11, includes an application request generation unit U1101 configured to generate a virtual SIM card application request, where the virtual SIM card application request carries a card selection parameter, a request sending unit U1102 configured to send the virtual SIM card application request to a network platform, a virtual SIM card receiving unit U1103 configured to receive target virtual SIM card data returned by the network platform, where the target virtual SIM card data corresponds to the card selection parameter, and at least includes a target virtual SIM card identifier and target virtual SIM card authentication information, a preset receptor baseband chip determining unit U1104 configured to determine a preset receptor baseband chip, and a configuration unit U1105 configured to configure the target virtual SIM card data in the preset receptor baseband chip of the terminal.

The apparatus may be configured to execute the method in FIG. 1, identical or corresponding technical characteristics may be mutually referenced.

To improve data network service fineness, in addition to a current geographic location of the terminal or a data network service region, the card selection parameter may be any one of a current geographic location, a device type of the terminal, a data network service price, or a data network service time limit, or the card selection parameter is any one of a service region, a device type of the terminal, a data network service price, or a data network service time limit.

The target virtual SIM card data at least includes the target virtual SIM card identifier and the target virtual SIM card authentication information. The target virtual SIM card identifier is used to distinguish the target virtual SIM card data from other virtual SIM card data such that the network platform and the terminal identify the target virtual SIM card data. The target virtual SIM card authentication information is used to make the terminal authenticated by the data network platform to access a data network. It should be noted that the terminal sends the authentication information to the data network platform for authentication. If the data network platform is not used as the network platform in the present disclosure, the terminal does not need to send the authentication information to the network platform in the present disclosure.

The virtual SIM card data having the authentication information enables basic functions of a physical SIM card to be completed after the virtual SIM card data is configured in a baseband chip. The virtual SIM card data may further include other data to extend functions of the virtual SIM card. For example, configuration data compatible with different device types is added such that the virtual SIM card data can be configured in terminals of different device types and becomes universal.

For a terminal in which multiple baseband chips are disposed, such as a dual SIM dual standby mobile phone, a baseband chip in which the target virtual SIM card data is configured needs to be determined, and a baseband chip in which the target virtual SIM card data is configured is the preset receptor baseband chip. If the user does not have a specific requirement for baseband chip selection, but only requires new SIM card data to replace existing SIM card data, the preset receptor baseband chip determining unit U1104 may randomly select a baseband chip on the terminal as the preset receptor baseband chip.

In another case, if the user has a specific requirement for baseband chip selection, for example, SIM card data in a baseband chip needs to be reserved, and SIM card data in a baseband chip needs to be replaced, the user has a purpose on baseband chip selection. In this case, the preset receptor baseband chip determining unit U1104 may include a baseband chip information display module (not shown) configured to display information about at least one baseband chip on the terminal, a baseband chip selection module (not shown) configured to receive a preset receptor baseband chip selection operation that is input by a user on the terminal before the target virtual SIM card data is configured in the preset receptor baseband chip of the terminal, a preset receptor baseband chip identifier obtaining module (not shown) configured to obtain an identifier of a selected baseband chip according to the preset receptor baseband chip selection operation, and a receptor baseband chip presetting module (not shown) configured to determine the baseband chip corresponding to the identifier as the preset receptor baseband chip.

The baseband chip information display module reads information about a baseband chip, and then displays the information on a terminal screen. The information may include an idle state or an occupied state of each baseband chip and information about SIM card data configured in the baseband chip. The user can learn of a status of the baseband chip using displayed information about the baseband chip in order to select the preset receptor baseband chip.

The baseband chip selection module provides a UI such that the user can perform the preset receptor baseband chip selection operation. The baseband chip selection module provides an interface for the user to perform a selection operation, and each baseband chip option respectively corresponds to an identifier of each baseband chip. The baseband chip selection module receives the preset receptor baseband chip selection operation that is input by the user on the terminal, the preset receptor baseband chip identifier obtaining module obtains, according to the preset receptor baseband chip selection operation, the identifier of the baseband chip selected by the user, and the receptor baseband chip presetting module determines the baseband chip corresponding to the identifier as the preset receptor baseband chip.

A process of configuring the target virtual SIM card data in the preset receptor baseband chip by the configuration unit U1105 is consistent with a process of configuring physical SIM card data in a baseband chip. If the preset receptor baseband chip is connected to the physical SIM card, and a mobile data channel of the physical SIM card is in an enabled state, the mobile data channel of the physical SIM card needs to be first disabled.

Figure 12:
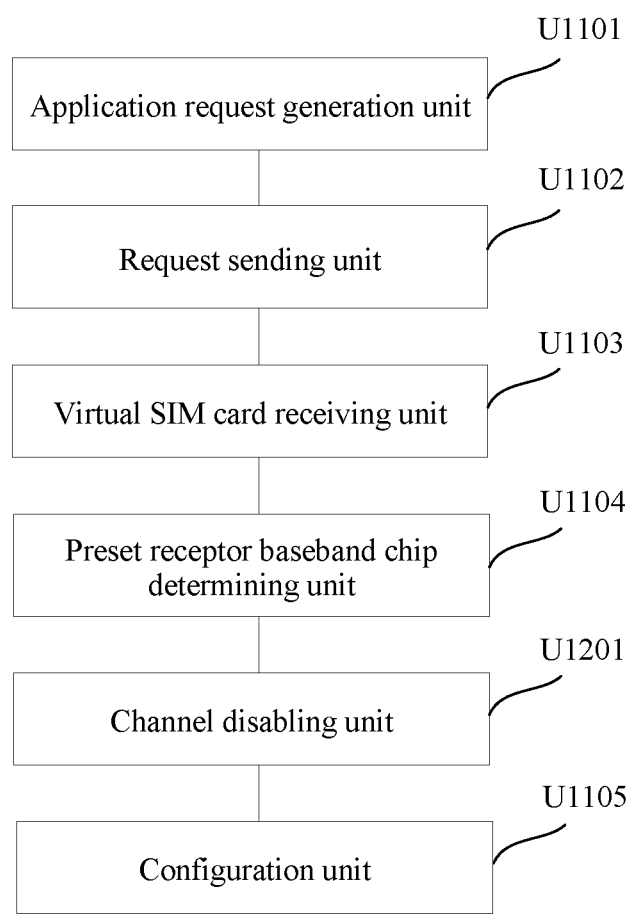
FIG. 12 is a block diagram of another communication control apparatus applied to a terminal according to an embodiment of the present disclosure.

Referring to FIG. 12, FIG. 12 is a block diagram of another communication control apparatus according to an embodiment of the present disclosure. The apparatus is applied to a terminal, and on the basis of the embodiment shown in FIG. 11, may include an application request generation unit U1101 configured to generate a virtual SIM card application request, where the virtual SIM card application request carries a card selection parameter, a request sending unit U1102 configured to send the virtual SIM card application request to a network platform, a virtual SIM card receiving unit U1103 configured to receive target virtual SIM card data returned by the network platform, where the target virtual SIM card data corresponds to the card selection parameter, and at least includes a target virtual SIM card identifier and target virtual SIM card authentication information, a preset receptor baseband chip determining unit U1104 configured to determine a preset receptor baseband chip, a channel disabling unit U1201 configured to disable the mobile data channel when a mobile data channel of a physical SIM card is in an enabled state, where the physical SIM card is connected to the preset receptor baseband chip, and a configuration unit U1105 configured to configure the target virtual SIM card data in the preset receptor baseband chip of the terminal.

After the preset receptor baseband chip determining unit U1104 determines the preset receptor baseband chip, the channel disabling unit U1201 may detect whether the mobile data channel of the physical SIM card connected to the preset receptor baseband chip is in an enabled state, and if the mobile data channel is in an enabled state, disable the mobile data channel.

Figure 13:
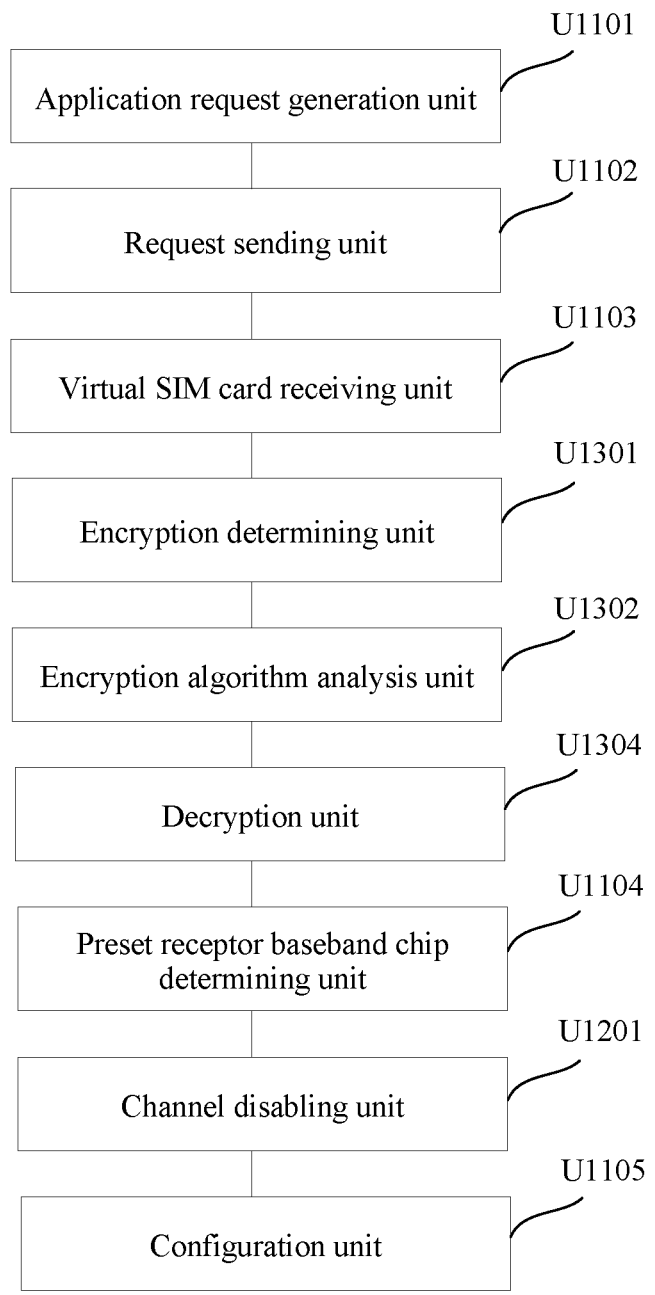
FIG. 13 is a block diagram of still another communication control apparatus applied to a terminal according to an embodiment of the present disclosure.

Referring to FIG. 13, FIG. 13 is a block diagram of still another communication control apparatus according to an embodiment of the present disclosure. The apparatus is applied to a terminal, and on the basis of the embodiment shown in FIG. 12, may include an application request generation unit U1101 configured to generate a virtual SIM card application request, where the virtual SIM card application request carries a card selection parameter, a request sending unit U1102 configured to send the virtual SIM card application request to a network platform, a virtual SIM card receiving unit U1103 configured to receive target virtual SIM card data returned by the network platform, where the target virtual SIM card data corresponds to the card selection parameter, and at least includes a target virtual SIM card identifier and target virtual SIM card authentication information, an encryption determining unit U1301 configured to determine whether the target virtual SIM card data is encrypted data before the target virtual SIM card data is configured in a preset receptor baseband chip of the terminal, an encryption algorithm analysis unit U1302 configured to analyze an encryption algorithm of the target virtual SIM card data if the target virtual SIM card data is the encrypted data, a decryption unit U1304 configured to obtain a decryption algorithm corresponding to the encryption algorithm, and decrypt the target virtual SIM card data using the decryption algorithm, a preset receptor baseband chip determining unit U1104 configured to determine a preset receptor baseband chip, a channel disabling unit U1201 configured to when a mobile data channel of a physical SIM card is in an enabled state, disable the mobile data channel, where the physical SIM card is connected to the preset receptor baseband chip, and a configuration unit U1105 configured to configure the target virtual SIM card data in the preset receptor baseband chip of the terminal.

The apparatus may be configured to execute the method in FIG. 3, identical or corresponding technical characteristics may be mutually referenced.

A protocol may be established between the network platform and the terminal for data encryption and decryption. The network platform encrypts the target virtual SIM card data according to the protocol and using a specified data encryption method, and a decryption method corresponding to the encryption method is preset on the terminal. According to the protocol, the target virtual SIM card data received by the virtual SIM card receiving unit U1103 is encrypted by default, and the decryption unit U1304 performs decryption using a preset default decryption method. In this case, the encryption determining unit U1301 and the encryption algorithm analysis unit U1302 may not be required.

The encryption determining unit U1301 to the decryption unit U1304 may further be located between the virtual SIM card receiving unit U1103 and the preset receptor baseband chip determining unit U1104.

Figure 14:
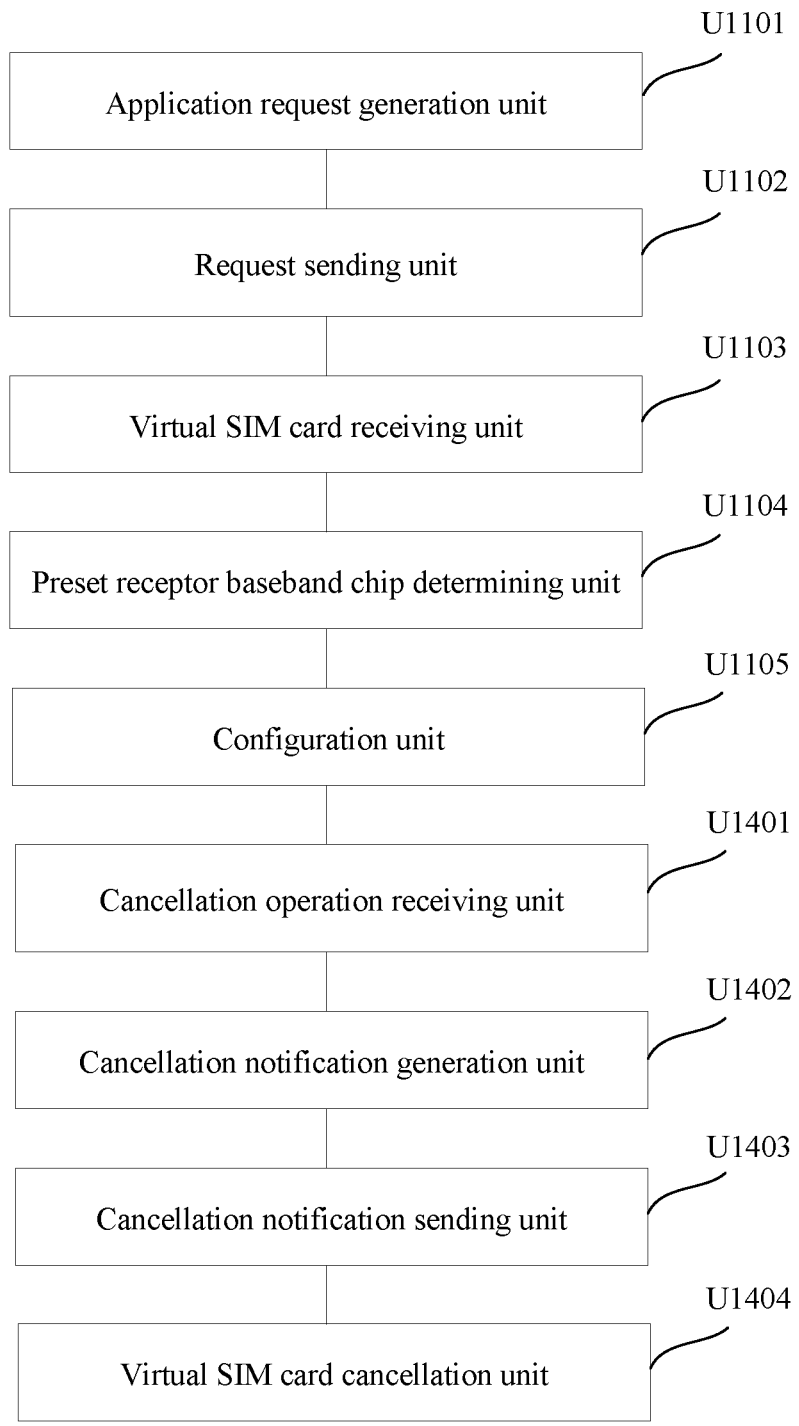
FIG. 14 is a block diagram of still another communication control apparatus applied to a terminal according to an embodiment of the present disclosure.

Referring to FIG. 14, FIG. 14 is a block diagram of still another communication control apparatus according to an embodiment of the present disclosure. The apparatus is applied to a terminal, and on the basis of the embodiment shown in FIG. 11, may include an application request generation unit U1101 configured to generate a virtual SIM card application request, where the virtual SIM card application request carries a card selection parameter, a request sending unit U1102 configured to send the virtual SIM card application request to a network platform, a virtual SIM card receiving unit U1103 configured to receive target virtual SIM card data returned by the network platform, where the target virtual SIM card data corresponds to the card selection parameter, and at least includes a target virtual SIM card identifier and target virtual SIM card authentication information, a preset receptor baseband chip determining unit U1104 configured to determine a preset receptor baseband chip, a configuration unit U1105 configured to configure the target virtual SIM card data in the preset receptor baseband chip of the terminal, a cancellation operation receiving unit U1401 configured to receive a virtual SIM card cancellation operation that is input by a user on the terminal, a cancellation notification generation unit U1402 configured to generate a virtual SIM card cancellation notification according to the virtual SIM card cancellation operation, a cancellation notification sending unit U1403 configured to send the virtual SIM card cancellation notification to the network platform, where the virtual SIM card cancellation notification carries a target virtual SIM card identifier such that the network platform resets invalid target virtual SIM card data in the network platform to valid, and the target virtual SIM card data corresponds to the target virtual SIM card identifier, and a virtual SIM card cancellation unit U1404 configured to delete the target virtual SIM card data in the preset receptor baseband chip according to the virtual SIM card cancellation operation.

The apparatus may be configured to execute the method in FIG. 4, identical or corresponding technical characteristics may be mutually referenced.

To help the user to observe a use status of a virtual SIM card, the apparatus may further include a virtual SIM card icon display unit (not shown), and the virtual SIM card icon display unit is configured to display a virtual SIM card icon on a terminal screen after the target virtual SIM card data is configured in the preset receptor baseband chip of the terminal. Correspondingly, the apparatus may further include a virtual SIM card icon removal unit (not shown), and the virtual SIM card icon removal unit is configured to hide or remove the virtual SIM card icon on the terminal screen after the virtual SIM card cancellation operation that is input by the user on the terminal is received. In addition, the apparatus may further include a data receiving progress display module (not shown) configured to display an animated icon on the terminal screen to represent a receiving progress of the target virtual SIM card data, and a network signal strength display module (not shown) configured to display an animated network signal icon to represent a network signal strength when the terminal is connected to the network platform. In conclusion, a display module may be disposed in the apparatus according to a need to visualize a process from virtual SIM card application to virtual SIM card cancellation and various variables and statuses of the variables that are involved in this process.

Figure 15:
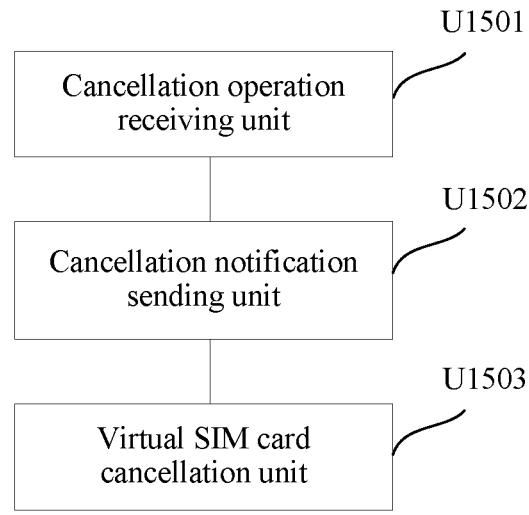
FIG. 15 is a block diagram of a virtual SIM card cancellation apparatus applied to a terminal for which virtual SIM card data is already configured according to an embodiment of the present disclosure.

Referring to FIG. 15, FIG. 15 is a block diagram of a virtual SIM card cancellation apparatus according to an embodiment of the present disclosure. The apparatus is applied to a terminal for which virtual SIM card data is already configured, the apparatus is based on the communication control apparatus shown in FIG. 11, and as shown in FIG. 15, the apparatus may include a cancellation operation receiving unit U1501 configured to receive a virtual SIM card cancellation operation that is input by a user on the terminal, a cancellation notification sending unit U1502 configured to send a virtual SIM card cancellation notification to a network platform according to the virtual SIM card cancellation operation, where the virtual SIM card cancellation notification carries a target virtual SIM card identifier such that the network platform resets invalid target virtual SIM card data in the network platform to valid, and the target virtual SIM card data corresponds to the target virtual SIM card identifier, and a virtual SIM card cancellation unit U1503 configured to delete the target virtual SIM card data in the preset receptor baseband chip according to the virtual SIM card cancellation operation.

The apparatus may be configured to execute the method in FIG. 5, identical or corresponding technical characteristics may be mutually referenced.

From a perspective of the network platform, after the target virtual SIM card data is sent to a terminal in response to a virtual SIM card application request of the terminal, the target virtual SIM card data cannot be sent to another terminal. If the target virtual SIM card data is sent to another terminal, repeated authentication occurs. Consequently, the user cannot normally use a data network service. Therefore, after sending the target virtual SIM card data to the terminal, the network platform needs to perform invalidation processing on the target virtual SIM card data.

If the network platform sends the target virtual SIM card data to the terminal, the target virtual SIM card data is forbidden from being used in the network platform. For example, the target virtual SIM card data is set to "reading forbidden" or marked as "used." Target virtual SIM card data that is set to "reading forbidden" or marked as "used" cannot be resent. In this case, to save data resources and improve resource utilization, after the terminal deletes the target virtual SIM card data, that is, cancels using the virtual SIM card, the network platform may recycle the target virtual SIM card data to make the target virtual SIM card data readable or available again.

To enable the network platform to recycle the target virtual SIM card data, after the cancellation operation receiving unit U1501 of the terminal receives the virtual SIM card cancellation operation that is input by the user, the cancellation notification sending unit U1502 obtains the target virtual SIM card identifier of the target virtual SIM card data in the preset receptor baseband chip, and sends, to the network platform, the virtual SIM card cancellation notification that carries the target virtual SIM card identifier. The virtual SIM card cancellation notification is generated according to a packet format specified by a protocol between the terminal and the network platform. Therefore, after receiving the virtual SIM card cancellation notification sent by the terminal, the network platform can find corresponding target virtual SIM card data according to the target virtual SIM card identifier in the virtual SIM card cancellation notification, and recycle the target virtual SIM card data. After sending the virtual SIM card cancellation notification to the network platform, the virtual SIM card cancellation unit U1503 deletes the target virtual SIM card data in the preset receptor baseband chip.

In an implementation manner, the virtual SIM card cancellation notification further carries a virtual SIM card cancellation parameter such that the network platform deletes the invalid target SIM card data in the network platform, or recycles the invalid target virtual SIM card data after a delay according to the virtual SIM card cancellation parameter.

The virtual SIM card cancellation apparatus provided in this embodiment may further include a cancellation receipt receiving unit (not shown) configured to receive a virtual SIM card cancellation receipt sent by a server, where the virtual SIM card cancellation receipt includes virtual SIM card service settlement information, and a cancellation receipt display unit (not shown) configured to display the virtual SIM card cancellation receipt.

To help the user to learn of related information such as a virtual SIM card use time and virtual SIM card service settlement information, the network platform sends a virtual SIM card cancellation receipt to the terminal after receiving the virtual SIM card cancellation notification. The virtual SIM card cancellation receipt may include the virtual SIM card use time and the virtual SIM card service settlement information that correspond to the target virtual SIM card identifier, and the virtual SIM card service settlement information includes data network service charges, a virtual SIM card balance, and the like. After the cancellation receipt receiving unit receives the virtual SIM card cancellation receipt sent by a server, the cancellation receipt display unit displays the virtual SIM card cancellation receipt for the user to view.

Figure 16:
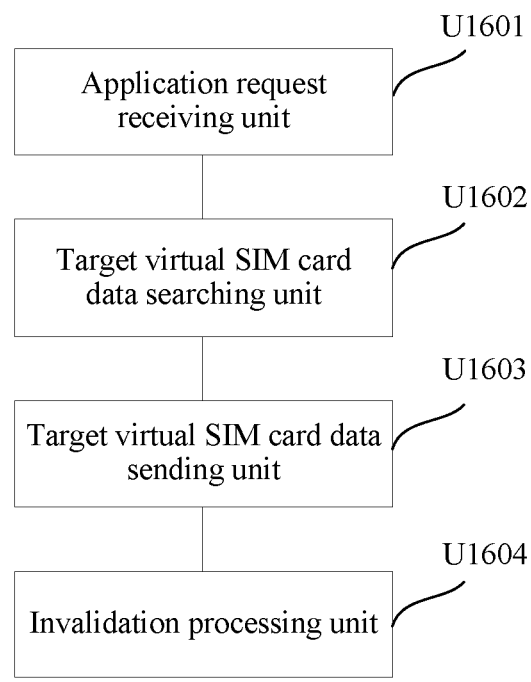
FIG. 16 is a block diagram of a communication control apparatus applied to a network platform according to an embodiment of the present disclosure.

Referring to FIG. 16, FIG. 16 is a block diagram of a communication control apparatus according to an embodiment of the present disclosure. The apparatus is applied to a network platform, and as shown in FIG. 16, the apparatus may include an application request receiving unit U1601 configured to receive a virtual SIM card application request sent by a terminal, where the virtual SIM card application request carries a card selection parameter, a target virtual SIM card data searching unit U1602 configured to search for target virtual SIM card data corresponding to the card selection parameter, where the target virtual SIM card data at least includes a target virtual SIM card identifier and target virtual SIM card authentication information, a target virtual SIM card data sending unit U1603 configured to send the target virtual SIM card data to the terminal, and an invalidation processing unit U1604 configured to perform invalidation processing on the target virtual SIM card data that is in the network platform and corresponds to the card selection parameter.

The apparatus may be configured to execute the method in FIG. 6, identical or corresponding technical characteristics may be mutually referenced.

If a data network platform is used as the network platform in the present disclosure, because the data network platform can dynamically update location information of the terminal, the card selection parameter sent by the terminal may be null. Therefore, after the application request receiving unit U1601 receives the virtual SIM card application request, the target virtual SIM card data searching unit U1602 learns, by means of reading, that the card selection parameter is null in order to obtain corresponding local SIM card data as the target virtual SIM card data directly according to a current location of the terminal that is recorded in the data network platform and according to the current location of the terminal. The target virtual SIM card data sending unit U1603 returns local virtual SIM card data (that is, the target virtual SIM card data) to the terminal, that is, if the card selection parameter received by the data network platform is null, the data network platform returns, to the terminal by default, local virtual SIM card data corresponding to the current location of the terminal.

After receiving the virtual SIM card application request sent by the terminal, the application request receiving unit U1601 reads the card selection parameter in the virtual SIM card application request. In addition to a current geographic location of the terminal or a data network service region, the card selection parameter may further include any one of a device type of the terminal, a data network service price, or a data network service time limit, or the card selection parameter may be any one of a current geographic location, a device type of the terminal, a data network service price, or a data network service time limit, or the card selection parameter is any one of a data network service region, a data network service price, or a data network service time limit.

The network platform stores virtual SIM card data. In an implementation manner, the virtual SIM card data is classified for storing and may be classified at multiple levels. For example, a first-level classification is a data network service region, a second-level classification is a device type of the terminal, a third-level classification is a data network service price, and a fourth-level classification is a data network service time limit. Correspondingly, the target virtual SIM card data searching unit U1602 compares the obtained card selection parameter with a classification label of the virtual SIM card data. If a classification label corresponding to virtual SIM card data conforms to all card selection parameters, the virtual SIM card data meets a condition and is used as the target virtual SIM card data, and the target virtual SIM card data sending unit U1603 returns the virtual SIM card data to the terminal. In another implementation manner, an attribute entry is set for each piece of virtual SIM card data, and the attribute entry is used to describe a data network service region, a data network service price, and a data network service time limit that correspond to the virtual SIM card data, and/or a device type of the terminal that is applicable to the virtual SIM card data. Correspondingly, the target virtual SIM card data searching unit U1602 compares the obtained card selection parameter with an attribute entry of the virtual SIM card data in the network platform, and if the card selection parameter is a subset of the attribute entry, the virtual SIM card data is successfully found, and virtual SIM card data corresponding to the attribute entry is used as the target virtual SIM card data. It should be noted that, in the latter implementation manner, there may be multiple pieces of virtual SIM card data in the network platform that meet a condition specified by the card selection parameter. In this case, the target virtual SIM card data searching unit U1602 randomly selects one piece of virtual SIM card data from the multiple pieces of virtual SIM card data that meet the condition, and uses the selected virtual SIM card data as the target virtual SIM card data. If the target virtual SIM card data searching unit U1602 cannot find the virtual SIM card data corresponding to the card selection parameter, the search fails. In this case, the network platform may send a data search failure notification to the terminal, to remind the user to modify the card selection parameter or to abandon the application.

After the target virtual SIM card data sending unit U1603 sends the target virtual SIM card data to the terminal, the target virtual SIM card data cannot be sent to another terminal. If the target virtual SIM card data is sent to another terminal, repeated authentication occurs. Consequently, the user cannot normally use a data network service. Therefore, after the target virtual SIM card data sending unit U1603 sends the target virtual SIM card data to the terminal, the invalidation processing unit U1604 needs to perform invalidation processing on the target virtual SIM card data. An implementation manner for performing invalidation processing on the target virtual SIM card data by the invalidation processing unit U1604 is to delete the target virtual SIM card data. This manner can thoroughly prevent the target virtual SIM card data from being resent to different terminals, and is also conducive to user privacy protection. However, the network platform needs to constantly generate new target virtual SIM card data to meet new requirements of virtual SIM card application, and this wastes resources.

Another implementation manner for performing invalidation processing on the target virtual SIM card data by the invalidation processing unit U1604 is to forbid the target virtual SIM card data from being reused in the network platform, and is to set the target virtual SIM card data to "reading forbidden" or mark the target virtual SIM card data as "used."

Still another implementation manner for performing invalidation processing on the target virtual SIM card data by the invalidation processing unit U1604 is to set an available virtual SIM card data resource pool and an unavailable virtual SIM card data resource pool in the network platform. Virtual SIM card data in the available virtual SIM card data resource pool is allowed to be used and sent to the terminal, and virtual SIM card data in the unavailable virtual SIM card data resource pool is not allowed to be used and sent to the terminal. The target virtual SIM card data searching unit U1602 searches only the available virtual SIM card data resource pool for the target virtual SIM card data according to the card selection parameter, and after the target virtual SIM card data sending unit U1603 sends the target virtual SIM card data to the terminal, the invalidation processing unit U1604 allocates the target virtual SIM card data to the unavailable virtual SIM card data resource pool.

It should be noted that the target virtual SIM card data searching unit U1602 searches available virtual SIM card data for the target virtual SIM card data according to the card selection parameter. The available virtual SIM card data is virtual SIM card data that is not forbidden from being used in the network platform, for example, virtual SIM card data that is not set to "using forbidden," virtual SIM card data that is not marked as "used" (or marked as "unused"), or virtual SIM card data in the available virtual SIM card data resource pool.

If invalidation processing performed by the invalidation processing unit U1604 is not deleting the target virtual SIM card data in the network platform, to save data resources and improve resource utilization, after the terminal deletes the target virtual SIM card data, that is, cancels using the virtual SIM card, the network platform may recycle the target virtual SIM card data, to make the target virtual SIM card data available again.

The target virtual SIM card data sending unit U1603 may be further configured to encrypt the target virtual SIM card data, and send the encrypted target virtual SIM card data to the terminal. The target virtual SIM card data sending unit U1603 first encrypts the target virtual SIM card data before sending the target virtual SIM card data. This helps to ensure security of the target virtual SIM card data and prevent the target virtual SIM card data from being rewritten or destroyed. A protocol may be established between the network platform and the terminal. The target virtual SIM card data sending unit U1603 encrypts the target virtual SIM card data according to the protocol and using a specified data encryption method, and a decryption method corresponding to the encryption method in the network platform is preset on the terminal. According to the protocol, the received target virtual SIM card data is encrypted by default, and is decrypted using a preset default decryption method. The target virtual SIM card data sending unit U1603 may encrypt the target virtual SIM card data using multiple algorithms. An encryption method of the network platform for different target virtual SIM card data may not be unique. In an implementation manner, the target virtual SIM card data sending unit U1603 adds an algorithm identifier to the encrypted target virtual SIM card data, and the algorithm identifier is used to represent an encryption algorithm used when the network platform encrypts the target virtual SIM card data. In this way, after receiving the encrypted target virtual SIM card data, the terminal may determine, according to whether the target virtual SIM card data includes an algorithm identifier, whether the target virtual SIM card data is the encrypted data, and obtain a corresponding decryption algorithm according to the algorithm identifier to decrypt the target virtual SIM card data.

According to the communication control apparatus that is applied to a network platform and is provided in this embodiment, after a virtual SIM card application request of a terminal is received, corresponding target virtual SIM card data is found according to a card selection parameter in the virtual SIM card application request, and then the target virtual SIM card data is returned to the terminal in order to implement online application for a SIM card, and help a user to change a SIM card, regardless of time and a location. In addition, invalidation processing is performed on the target virtual SIM card data that is already returned to the terminal to avoid a problem of repeated authentication on different terminals caused because virtual SIM card data is repeatedly sent.

Figure 17:
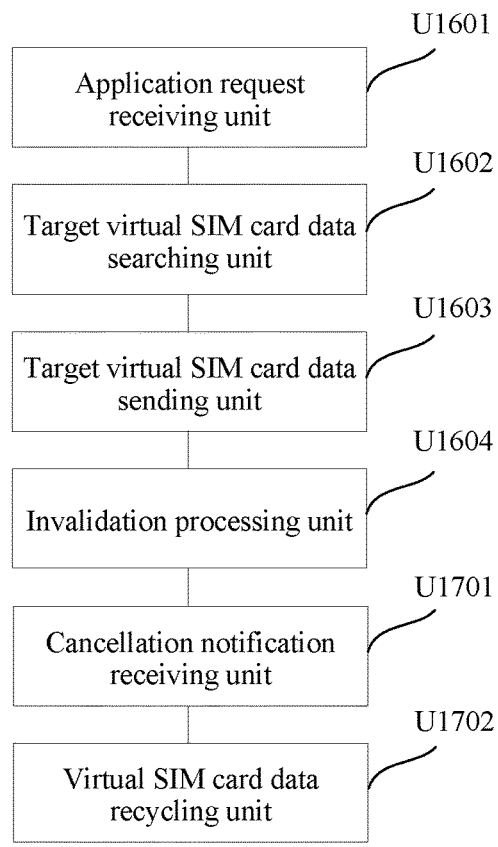
FIG. 17 is a block diagram of another communication control apparatus applied to a network platform according to an embodiment of the present disclosure.

Referring to FIG. 17, FIG. 17 is a block diagram of another communication control apparatus according to an embodiment of the present disclosure. The apparatus is applied to a network platform, and on the basis of the embodiment shown in FIG. 16, as shown in FIG. 17, the method includes an application request receiving unit U1601 configured to receive a virtual SIM card application request sent by a terminal, where the virtual SIM card application request carries a card selection parameter, a target virtual SIM card data searching unit U1602 configured to search for target virtual SIM card data corresponding to the card selection parameter, where the target virtual SIM card data at least includes a target virtual SIM card identifier and target virtual SIM card authentication information, a target virtual SIM card data sending unit U1603 configured to send the target virtual SIM card data to the terminal, an invalidation processing unit U1604 configured to perform invalidation processing on the target virtual SIM card data that is in the network platform and corresponds to the card selection parameter, a cancellation notification receiving unit U1701 configured to receive a virtual SIM card cancellation notification sent by the terminal, where the virtual SIM card cancellation notification carries a target virtual SIM card identifier, and a virtual SIM card data recycling unit U1702 configured to re-validate, according to the virtual SIM card cancellation notification, target virtual SIM card data that is in the network platform and corresponds to the target virtual SIM card identifier.

The apparatus may be configured to execute the method in FIG. 7, identical or corresponding technical characteristics may be mutually referenced.

If invalidation processing performed by the invalidation processing unit U1604 is not deleting the target virtual SIM card data to avoid a resource waste and improve resource utilization, the target virtual SIM card data on which invalidation processing is performed may be recycled. The recycling is re-validating the corresponding target virtual SIM card data in the network platform after the user cancels using a virtual SIM card such that the target virtual SIM card data sending unit U1603 may send re-validated target virtual SIM card data to a terminal that applies for a virtual SIM card.

After the user performs a virtual SIM card cancellation operation on the terminal, the terminal sends the virtual SIM card cancellation notification to the network platform, and adds the target virtual SIM card identifier in the target virtual SIM card data to the cancellation notification. After the cancellation notification receiving unit U1701 receives the cancellation notification, the virtual SIM card data recycling unit U1702 performs a target virtual SIM card data recycling process. This process further includes reading the target virtual SIM card identifier in the cancellation notification, searching for the target virtual SIM card data corresponding to the target virtual SIM card identifier, and then re-validating the target virtual SIM card data.

An implementation manner for performing invalidation processing on the target virtual SIM card data by the invalidation processing unit U1604 is to set the target virtual SIM card data to "reading forbidden" or mark the target virtual SIM card data as "used." Correspondingly, re-validating the target virtual SIM card data by the virtual SIM card data recycling unit U1702 is setting the target virtual SIM card data "reading allowed" or marking the target virtual SIM card data as "unused." Another implementation manner for performing invalidation processing on the target virtual SIM card data by the invalidation processing unit U1604 is to allocate the target virtual SIM card data to an unavailable virtual SIM card data resource pool. Correspondingly, re-validating the target virtual SIM card data by the virtual SIM card data recycling unit U1702 is reallocating, to an available virtual SIM card data resource pool, the target virtual SIM card data that is allocated to the unavailable virtual SIM card data resource pool.

If the virtual SIM card cancellation notification sent by the terminal carries a virtual SIM card cancellation parameter, after receiving the virtual SIM card cancellation notification, the network platform recycles the target virtual SIM card data after a delay, or deletes the corresponding target virtual SIM card data in the network platform according to the virtual SIM card cancellation parameter.

After receiving the virtual SIM card cancellation notification, the network platform may further send a virtual SIM card cancellation receipt to the terminal. The virtual SIM card cancellation receipt may include a virtual SIM card use time and virtual SIM card service settlement information that correspond to the target virtual SIM card identifier, and the virtual SIM card service settlement information includes data network service charges, a virtual SIM card balance, and the like.

Figure 18:
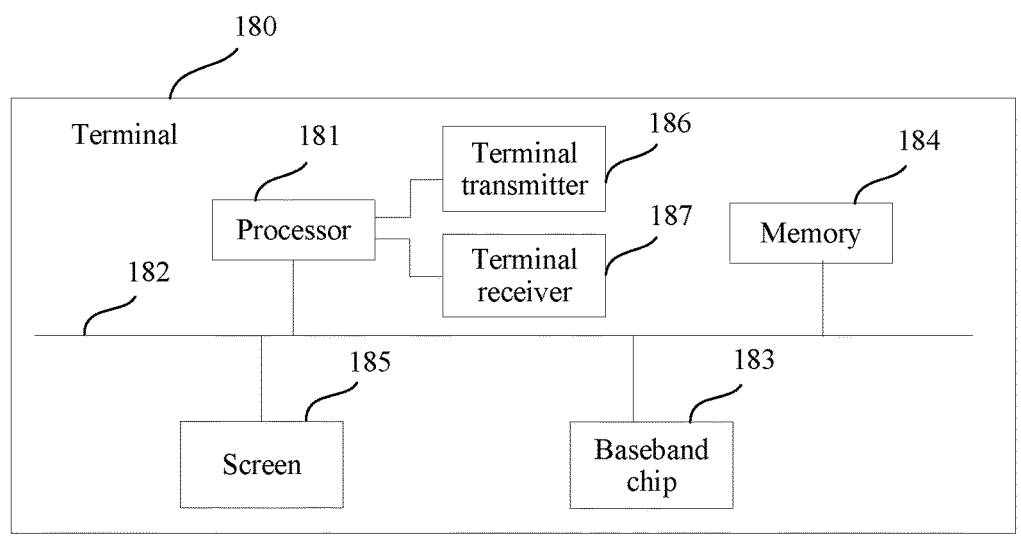
FIG. 18 is a structural block diagram of a terminal according to an embodiment of the present disclosure.

Referring to FIG. 18, FIG. 18 is a structural block diagram of a terminal 180 according to an embodiment of the present disclosure. The terminal 180 includes at least one processor 181, at least one communications bus 182, at least one baseband chip 183, a memory 184, a screen 185, a terminal transmitter 186, and a terminal receiver 187.

The communications bus 182 is configured to implement connection and communication between these components.

The screen 185 is configured to display items that include but are not limited to a variable and a status related to a communication process, and a variable and a status related to a processing process inside the terminal 180. The screen 185 also provides a human-machine interaction interface for a user.

The memory 184 may include a read-only memory (ROM) and a random access memory (RAM), and provides an instruction and data for the processor 181, and a part of the memory 184 may further include a non-volatile RAM (NVRAM).

In some implementation manners, the memory 184 stores the elements such as an executable module or a data structure, a subset thereof, or an extended set thereof. In this embodiment, the memory 184 includes an operating system and an application program module. The operating system includes various system programs to implement various basic services and process a hardware-based task, and the application program module includes various application programs, such as a desktop and a browser to implement various application services.

The baseband chip 183 includes but is not limited to a central processing unit (CPU), a channel encoder, a digital signal processor, a modem, and an interface module. The CPU is configured to control and manage communication, which includes but is not limited to timing control, digital system control, radio frequency control, or power saving control, and complete an item that includes but is not limited to software at a physical layer, a data link layer, a network layer, and an application layer that are of the mobile data network communications protocol. The channel encoder is configured to perform channel coding and encryption for communication service information and control information, and the channel coding includes but is not limited to convolutional coding, a parity check code, or interleaving and burst pulse formatting. The digital signal processor is configured to complete functions that include but are not limited to channel balancing and voice coding/decoding. The modem is configured to complete signal modulation and demodulation required by communication. The interface module includes an analog interface, a digital interface, and an auxiliary interface. The analog interface includes a voice input/output interface and a radio frequency control interface, the auxiliary interface is configured to collect an analog parameter such as a battery level or battery temperature, and the digital interface includes but is not limited to a system interface, a SIM card interface, a test interface, and a memory interface.

In this embodiment of the present disclosure, the processor 181 is configured to generate a virtual SIM card application request by invoking a program or an instruction stored in the memory 184, where the virtual SIM card application request carries a card selection parameter, the terminal transmitter 186 is configured to send the virtual SIM card application request to a network platform, the terminal receiver 187 is configured to receive target virtual SIM card data returned by the network platform, where the target virtual SIM card data corresponds to the card selection parameter, and at least includes a target virtual SIM card identifier and target virtual SIM card authentication information, and the processor 181 is further configured to determine a preset receptor baseband chip, and configure the target virtual SIM card data in the preset receptor baseband chip of the terminal 180.

Optionally, the card selection parameter includes at least one of a current geographic location of the terminal 180, a device type of the terminal 180, a data network service price, or a data network service time limit.

Optionally, when determining the preset receptor baseband chip, the processor 181 is further configured to randomly designate one of multiple baseband chips as the preset receptor baseband chip.

Optionally, when determining the preset receptor baseband chip, the processor 181 is further configured to display information about each baseband chip on the terminal 180 on the screen 185, the screen 185 is configured to obtain a preset receptor baseband chip selection operation of a user, and when determining the preset receptor baseband chip, the processor 181 is further configured to obtain an identifier of a selected baseband chip according to information about the preset receptor baseband chip selection operation, and determine the baseband chip corresponding to the identifier as the preset receptor baseband chip.

Optionally, before configuring the target virtual SIM card data in the preset receptor baseband chip of the terminal 180, the processor 181 is further configured to disable the mobile data channel if a mobile data channel of a physical SIM card is in an enabled state, where the physical SIM card is connected to the preset receptor baseband chip.

Optionally, before the virtual SIM card application request is generated, the screen 185 is further configured to obtain a virtual SIM card cancellation operation that is input by the user, and the processor 181 is further configured to obtain a card selection parameter of a virtual SIM card according to information about the virtual SIM card application operation.

Optionally, the screen 185 is further configured to receive a virtual SIM card cancellation operation that is input by the user, the processor 181 is further configured to generate a virtual SIM card cancellation notification according to information about the virtual SIM card cancellation operation, the terminal transmitter 186 is further configured to send the virtual SIM card cancellation notification to the network platform, where the virtual SIM card cancellation notification carries a target virtual SIM card identifier, the target virtual SIM card identifier is used to make the network platform reset invalid target virtual SIM card data in the network platform to valid, and the target virtual SIM card data corresponds to the target virtual SIM card identifier, and the processor 181 is further configured to delete the target virtual SIM card data in the preset receptor baseband chip according to the virtual SIM card cancellation operation.

Optionally, after configuring the target virtual SIM card data in the preset receptor baseband chip of the terminal 180, the processor 181 is further configured to display a virtual SIM card icon on the screen 185.

Optionally, after the virtual SIM card cancellation operation that is input by the user on the terminal 180 is received, the processor 181 is further configured to hide or remove the virtual SIM card icon on the screen 185.

Figure 19:
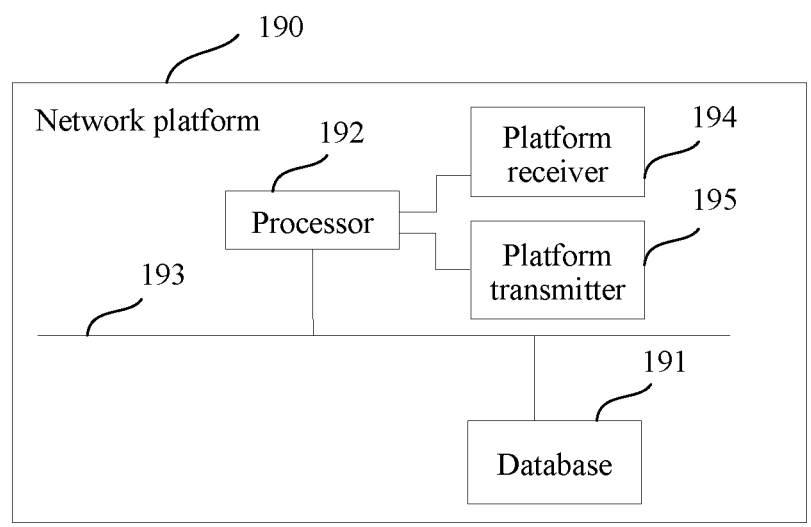
FIG. 19 is a structural block diagram of a network platform according to an embodiment of the present disclosure.

Referring to FIG. 19, FIG. 19 is a structural block diagram of a network platform 190 according to an embodiment of the present disclosure. The network platform 190 includes a database 191, a processor 192, at least one communications bus 193, a platform receiver 194, and a platform transmitter 195, where the database 191 is configured to store virtual SIM card data, the communications bus 193 is configured to implement connection and communication between the database 191 and the processor 192, the platform receiver 194 is configured to receive a virtual SIM card application request sent by a terminal, where the virtual SIM card application request carries a card selection parameter, the processor 192 is configured to search for target virtual SIM card data corresponding to the card selection parameter, where the target virtual SIM card data at least includes a target virtual SIM card identifier and target virtual SIM card authentication information, the platform transmitter 195 is configured to send the target virtual SIM card data to the terminal, and the processor 192 is further configured to perform invalidation processing on the target virtual SIM card data that is in the database 191 and that corresponds to the card selection parameter.

Optionally, the platform receiver 194 is further configured to receive a virtual SIM card cancellation notification sent by the terminal, where the virtual SIM card cancellation notification carries a target virtual SIM card identifier, and the processor 192 is further configured to re-validate, according to the virtual SIM card cancellation notification, target virtual SIM card data that is in the database 191 and that corresponds to the target virtual SIM card identifier.

Optionally, when performing invalidation processing on the target virtual SIM card data that is in the database 191 and corresponds to the card selection parameter, the processor 192 is further configured to delete the target virtual SIM card data.

Optionally, when performing invalidation processing on the target virtual SIM card data that is in the database 191 and corresponds to the card selection parameter, the processor 192 is further configured to set the target virtual SIM card data to "reading forbidden," or mark the target virtual SIM card data as "used." Correspondingly, when re-validating the target virtual SIM card data that is in the database 191 and corresponds to the target virtual SIM card identifier, the processor 192 is further configured to reset the "reading forbidden" target virtual SIM card data to "reading allowed," or mark, as "unused," the target virtual SIM card data marked as "used."

Optionally, when searching for the target virtual SIM card data corresponding to the card selection parameter, the processor 192 is further configured to compare the card selection parameter with an attribute entry of the virtual SIM card data in the network platform 190, where if the card selection parameter is a subset of the attribute entry, the target virtual SIM card data is successfully found, and virtual SIM card data corresponding to the attribute entry is used as the target virtual SIM card data, or if the card selection parameter is not a subset of the attribute entry, the target virtual SIM card data fails to be found.

Optionally, when the target virtual SIM card data is sent to the terminal, the processor 192 is further configured to encrypt the target virtual SIM card data, and the platform transmitter 195 is configured to send the encrypted target virtual SIM card data to the terminal.

According to the network platform 190 provided in this embodiment, in response to a virtual SIM card application request of a terminal, corresponding target virtual SIM card data is found according to a card selection parameter in the virtual SIM card application request, and then the target virtual SIM card data is returned to the terminal in order to implement online application for a SIM card, and help a user to change a SIM card, regardless of time and a location. In addition, invalidation processing is performed on the target virtual SIM card data that is already returned to the terminal to avoid a problem of repeated authentication on different terminals caused because virtual SIM card data is repeatedly sent. Correspondingly, after a virtual SIM card cancellation notification sent by the terminal is received, virtual SIM card data on which invalidation processing is performed may be further recycled, that is, invalid virtual SIM card data is re-validated in order to improve data resource utilization, and reduce resource consumption. Moreover, the network platform may further encrypt the target virtual SIM card data. This helps to ensure security of the target virtual SIM card data and prevent the target virtual SIM card data from being rewritten or destroyed.

Algorithms in the embodiments in this specification are all described in a progressive manner, for same or similar parts in the embodiments, reference may be made to these embodiments, and each embodiment focuses on a difference from other embodiments. Especially, apparatus or system embodiments are basically similar to a method embodiment, and therefore are described briefly, for related parts, reference may be made to partial descriptions in the method embodiment. The described apparatus and system embodiments are merely examples. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. A person of ordinary skill in the art may understand and implement the embodiments of the present disclosure without creative efforts.

The present disclosure can be described in the general context of executable computer instructions executed by a computer, for example, a program module. Generally, the program unit includes a routine, program, object, component, data structure, and the like for executing a particular task or implementing a particular abstract data type. The present disclosure may also be practiced in distributed computing environments in which tasks are performed by remote processing devices that are connected through a communications network. In a distributed computing environment, program modules may be located in both local and remote computer storage media including storage devices.

It should be noted that in this specification, relational terms such as first and second are only used to distinguish one entity or operation from another, and do not necessarily require or imply that any actual relationship or sequence exists between these entities or operations. Moreover, the terms "include," "comprise," or their any other variant is intended to cover a non-exclusive inclusion such that a process, a method, an apparatus, or a device that includes a list of elements not only includes those elements but also includes other elements which are not expressly listed, or further includes elements inherent to such process, method, article, or apparatus. An element preceded by "includes a . . . " does not, without more constraints, preclude the presence of additional identical elements in the process, method, apparatus, or device that includes the element.

The foregoing descriptions are merely specific implementation algorithms of the present disclosure. It should be noted that a person of ordinary skill in the art may make several improvements or polishing without departing from the principle of the present disclosure and the improvements or polishing shall fall within the protection scope of the present disclosure.

What is claimed is:

1. A method applied to a terminal comprising a plurality of baseband apparatuses, wherein the method comprises:
   generating a virtual subscriber identity module (SIM) card application request comprising a card selection parameter;
   sending, from the terminal, the virtual SIM card application request to a network platform;
   receiving, from the network platform, virtual SIM card data that corresponds to the card selection parameter, wherein the virtual SIM card data comprises a virtual SIM card identifier and virtual SIM card authentication information;
   selecting a baseband apparatus from the plurality of baseband apparatuses to obtain a receptor baseband apparatus based on whether the baseband apparatus is in an idle state or an occupied state, wherein the receptor baseband apparatus is coupled to a physical SIM card, and wherein the physical SIM card comprises physical SIM card data;
   disabling a mobile data channel of the physical SIM card when the mobile data channel is in an enabled state, wherein the physical SIM card is coupled to the receptor baseband apparatus in the enabled state; and
   configuring the virtual SIM card data in the receptor baseband apparatus of the terminal to replace the physical SIM card data with the virtual SIM card data in response to the disabling of the mobile data channel of the physical SIM card.

2. The method of claim 1, wherein the card selection parameter comprises a current geographic location of the terminal.

3. The method of claim 1, wherein determining the receptor baseband apparatus comprises:
   obtaining an identifier of the selected baseband apparatus according to the selection operation to obtain the receptor baseband apparatus; and
   determining the baseband apparatus from the plurality of baseband apparatuses that corresponds to the identifier of the selected baseband apparatus as the receptor baseband apparatus.

4. The method of claim 1, wherein after configuring the virtual SIM card data in the receptor baseband apparatus, the method further comprises displaying a virtual SIM card icon on a terminal screen of the terminal.

5. The method of claim 1, further comprising:
   receiving a virtual SIM card cancellation operation on the terminal;
   generating a virtual SIM card cancellation notification according to the virtual SIM card cancellation operation, wherein the virtual SIM card cancellation notification comprises the virtual SIM card identifier, and wherein the virtual SIM card identifier is associated with the virtual SIM card data at the network platform;
   sending the virtual SIM card cancellation notification to the network platform to permit the network platform to reset invalid data of the virtual SIM card data in the network platform to valid data of the virtual SIM card data, wherein the virtual SIM card data corresponds to the virtual SIM card identifier; and
   deleting the virtual SIM card data in the receptor baseband apparatus according to the virtual SIM card cancellation operation.

6. The method of claim 5, wherein after receiving the virtual SIM card cancellation operation, the method further comprises hiding or removing a virtual SIM card icon on the terminal screen of the terminal.

7. The method of claim 1, wherein the card selection parameter comprises a device type of the terminal.

8. The method of claim 1, wherein the card selection parameter comprises a data network service price.

9. The method of claim 1, wherein the card selection parameter comprises a data network service time limit.

10. A virtual subscriber identity module (SIM) card cancellation method applied to a terminal for which a virtual SIM card is already configured, wherein the virtual SIM card cancellation method comprises:

receiving a virtual SIM card cancellation operation at the terminal, wherein the terminal comprises a plurality of baseband apparatuses;

generating a virtual SIM card cancellation notification according to the virtual SIM card cancellation operation, wherein the virtual SIM card cancellation notification comprises a virtual SIM card identifier associated with virtual SIM card data;

sending, by the terminal, the virtual SIM card cancellation notification to a network platform, wherein the virtual SIM card data corresponds to the virtual SIM card identifier;

selecting a receptor baseband apparatus from the plurality of baseband apparatuses, wherein the receptor baseband apparatus comprises the virtual SIM card data;

deleting, by the terminal, the virtual SIM card data in the receptor baseband apparatus according to the virtual SIM card cancellation operation so as to:

disable a mobile data channel of the virtual SIM card when the mobile data channel is in an enabled state; and enable a physical SIM card coupled to the receptor baseband apparatus to an enabled state to replace the virtual SIM card data with physical SIM card data in response to the disabling of the mobile data channel of the virtual SIM card, wherein the physical SIM card comprises the physical SIM card data.

11. The virtual SIM card cancellation method of claim 10, wherein the virtual SIM card cancellation notification further comprises a virtual SIM card cancellation parameter, and wherein the virtual SIM card cancellation parameter causes the network platform to delete invalid data of the virtual SIM card data in the network platform according to the virtual SIM card cancellation parameter.

12. The virtual SIM card cancellation method of claim 10, further comprising:

receiving a virtual SIM card cancellation receipt from a server, wherein the virtual SIM card cancellation receipt comprises virtual SIM card service settlement information; and displaying the virtual SIM card cancellation receipt.

13. A terminal, comprising:

a processor;

a memory coupled to the processor;

a plurality of baseband apparatuses coupled to the processor;

a transmitter coupled to the processor, wherein the transmitter is configured to send a virtual subscriber identity module (SIM) card application request comprising a card selection parameter to a network platform; and a receiver coupled to the processor, wherein the receiver is configured to receive virtual SIM card data from the network platform, wherein the virtual SIM card data corresponds to the card selection parameter and comprises a virtual SIM card identifier and virtual SIM card authentication information, and the memory having program instructions stored thereon that, upon execution by the processor, cause the terminal to:

generate the virtual SIM card application request;

select a baseband apparatus from the plurality of baseband apparatuses to obtain a receptor baseband apparatus based on whether the baseband apparatus is in an idle state or an occupied state, wherein the receptor baseband apparatus is coupled to a physical SIM card, wherein the physical SIM card comprises physical SIM card data;

disable a mobile data channel of the physical SIM card when the mobile data channel is in an enabled state, wherein the physical SIM card is coupled to the receptor baseband apparatus in the enabled state; and configure the virtual SIM card data in the receptor baseband apparatus of the terminal to replace the physical SIM card data with the virtual SIM card data in response to disabling the mobile data channel of the physical SIM card.

14. The terminal of claim 13, wherein the card selection parameter comprises at least one of a current geographic location of the terminal, a device type of the terminal, a data network service price, or a data network service time limit.

15. The terminal according to claim 13, further comprising a terminal screen coupled to the processor, wherein the processor is further configured to display information about each of the baseband apparatuses on the terminal screen when determining the baseband apparatus from the plurality of baseband apparatuses, wherein the terminal screen is configured to receive a selection operation to select the baseband apparatus from a user, and wherein the instructions further cause the processor to be configured to:

obtain an identifier of the selected baseband apparatus according to the selection operation to obtain the receptor baseband apparatus; and determine the baseband apparatus from the plurality of baseband apparatuses that corresponds to the identifier of the selected baseband apparatus is the receptor baseband apparatus.

16. The terminal of claim 13, further comprising a terminal screen coupled to the processor, wherein the instructions further cause the processor to be configured to display a virtual SIM card icon on the terminal screen after configuring the virtual SIM card data in the receptor baseband apparatus.

17. The terminal of claim 16, wherein the terminal screen is configured to receive a virtual SIM card cancellation operation from a user, wherein the instructions further cause the processor to be configured to generate a virtual SIM card cancellation notification according to the virtual SIM card cancellation operation, wherein the virtual SIM card cancellation notification comprises the virtual SIM card identifier, wherein the virtual SIM card identifier is associated with the virtual SIM card data at the network platform, wherein the transmitter is further configured to send the virtual SIM card cancellation notification to the network platform, and wherein the processor is further configured to delete the virtual SIM card data in the receptor baseband apparatus according to the virtual SIM card cancellation operation.

18. The terminal of claim 17, wherein after receiving the virtual SIM card cancellation operation from the user, the processor is further configured to hide or remove the virtual SIM card icon on the terminal screen.

19. The terminal of claim 13, wherein the card selection parameter comprises a device type of the terminal.

20. The terminal of claim 13, wherein the card selection parameter comprises a data network service price.

21. The terminal of claim 13, wherein the card selection parameter comprises a data network service time limit.

* * * * *